(12) United States Patent
Buhrmann et al.

(10) Patent No.: US 11,899,674 B2
(45) Date of Patent: Feb. 13, 2024

(54) SYSTEMS AND METHODS TO DETERMINE AND UTILIZE CONCEPTUAL RELATEDNESS BETWEEN NATURAL LANGUAGE SOURCES

(71) Applicant: VETTD, INC., Bellevue, WA (US)

(72) Inventors: Andrew Buhrmann, Redmond, WA (US); Michael Buhrmann, North Bend, WA (US); Ali Shokoufandeh, New Hope, PA (US); Jesse Smith, Bellevue, WA (US); Yakov Keselman, Bellevue, WA (US); Kurtis Peter Dane, Newcastle, WA (US)

(73) Assignee: VETTD, INC., Bellevue, WA (US)

( * ) Notice: Subject to any disclaimer, the term of this patent is extended or adjusted under 35 U.S.C. 154(b) by 249 days.

(21) Appl. No.: 17/148,344

(22) Filed: Jan. 13, 2021

(65) Prior Publication Data
US 2021/0294811 A1    Sep. 23, 2021

Related U.S. Application Data

(62) Division of application No. 14/952,495, filed on Nov. 25, 2015, now Pat. No. 11,003,671.

(60) Provisional application No. 62/215,976, filed on Sep. 9, 2015, provisional application No. 62/084,836, filed on Nov. 26, 2014.

(51) Int. Cl.
| | | |
|---|---|---|
| G06F 16/00 | (2019.01) | |
| G06F 16/2457 | (2019.01) | |
| G06F 16/248 | (2019.01) | |
| G06F 16/28 | (2019.01) | |
| G06F 16/2452 | (2019.01) | |
| G06F 16/36 | (2019.01) | |
| G06F 16/33 | (2019.01) | |
| G06F 40/14 | (2020.01) | |
| G06Q 10/1053 | (2023.01) | |

(52) U.S. Cl.
CPC ...... *G06F 16/24578* (2019.01); *G06F 16/248* (2019.01); *G06F 16/24522* (2019.01); *G06F 16/285* (2019.01); *G06F 16/3347* (2019.01); *G06F 16/367* (2019.01); *G06F 40/14* (2020.01); *G06Q 10/1053* (2013.01)

(58) Field of Classification Search
CPC .................................................. G06F 16/3347
See application file for complete search history.

*Primary Examiner* — Ajith Jacob
(74) *Attorney, Agent, or Firm* — FisherBroyles LLP

(57) ABSTRACT

A microprocessor executable method and system for determining the semantic relatedness and meaning between at least two natural language sources is described in a prescribed context. Portions of natural languages are vectorized and mathematically processed to express relatedness as a calculated metric. The metric is associable to the natural language sources to graphically present the level of relatedness between at least two natural language sources. The metric may be re-determined with algorithms designed to compare the natural language sources with a knowledge data bank so the calculated metric can be ascertained with a higher level of certainty.

15 Claims, 17 Drawing Sheets

Text Relevance Generator

Conceptual Relevance Generator

Fig. 12

Dashboard / Sales Executive — 800

Sales Executive — 804

15 Total Candidates(s)
6 Pending   3 Qualified   6 Eliminated

Edit ▼ — 808

| Action ▼ 832 | Rank ▼ 816 | 820 First ▼ | 824 Last ▼ | 828 Added ▼ | 830 Status ▼ |
|---|---|---|---|---|---|
| Review | 1 | Sarah | North | Aug 25 | Qualified |
| Review | 2 | Valdez | Geraldo | Aug 25 | Qualified |
| Review | 3 | Jack | Dolan | Aug 25 | Qualified |
| Review | 4 | Candice | Smith | Aug 25 | Pending |
| Review | 5 | Michelle | Kwon | Aug 25 | Pending |
| Review | 6 | Andrew | Gunderson | Aug 25 | Pending |
| Review | 7 | Mark | Andrews | Aug 25 | Pending |
| Review | 8 | Martell | McBride | Aug 25 | Pending |
| Review | 9 | Rebecca | Toth | Aug 25 | Pending |
| Review | 10 | Jeremy | Klein | Aug 25 | Eliminated |
| Review | 11 | Dan | Jordan | Aug 25 | Eliminated |
| Review | 12 | Elliana | Brewster | Aug 25 | Eliminated |
| Review | 13 | Jennifer | Macintyre | Aug 25 | Eliminated |
| Review | 14 | Latasha | Jones | Aug 25 | Eliminated |
| Review | 15 | Darius | True | Aug 25 | Eliminated |

SYSTEMS AND METHODS TO DETERMINE AND UTILIZE CONCEPTUAL RELATEDNESS BETWEEN NATURAL LANGUAGE SOURCES

PRIORITY CLAIM

This application is a divisional of U.S. application Ser. No. 14/952,495 filed Nov. 25, 2015; which application claims the benefit of U.S. Provisional Patent Application No. 62/084,836 filed on Nov. 26, 2014 and U.S. Provisional Patent Application No. 62/215,976 filed on Sep. 9, 2015. All of the foregoing applications are hereby incorporated by reference in their entireties as if fully set forth herein.

FIELD OF THE INVENTION

The invention concerns semantic analysis of natural languages, including by utilizing matching algorithms.

BACKGROUND OF THE INVENTION

With the advent of applicant tracking systems, social media based recruiting strategies, and/or other web based staffing platforms, companies have access to an immense pool of potential candidates to fill a given job. A problem arises when this pool becomes too large to be useful. A company has too many candidates when the time it would take to evaluate them effectively costs more than the time saved by making a choice without reviewing all available options. The pressure a company feels to fill a position quickly often diminishes the value of having access to a large pool of candidates. In addition, attempts to evaluate all options while relying on limited resources leads to inappropriate hiring practices based on assumptions and intuition which cause missed opportunities for candidates and/or sunk cost for a company choosing to hire someone who turns out to be under-qualified. These mistakes are costly and/or have a significant economic impact.

Much technology exists currently to assist a hiring manager in tracking and/or evaluating job candidates. These systems may offer a means of sorting and/or filtering candidates based on keywords contained within a résumé. Other systems may parse a natural language résumé to extract information, such as years of experience or type of education, into a machine readable form to extend sorting and filtering capabilities. Such methodologies provide narrow quantitative evaluation of a candidate and are inherently limited by the capabilities and understanding of the user of such a system.

Alternative human resource ("HR") tools don't display the same type of analysis based on résumé data alone. Current market solutions might display additional information such as measure of skills or ratings on various attributes of the candidate but these are all obtained through manual input. Information on skills might be gleaned through surveys/tests administered by the system on a specific candidate and ratings have to be inputted by HR employees utilizing the system. Prior to this invention, there was no way for an inexperienced hiring manager to know what defines a good candidate and how that compares to a low quality candidate.

The hiring industry faces several problems that remain mostly unsolved despite the amount of software tools becoming available. The hiring of "bad" employees accounts for an estimated annual loss of $280B. An estimated 20% of the current workforce is considered to be a "bad hire" or "under qualified". Bad hires typically occur because companies need to fill roles quickly and it wasn't initially clear that candidates were unqualified. It takes an average of 52 days to source, select, and hire a candidate. This timeline is typically too long in many settings causing shortcuts to be taken. It takes a seasoned résumé reviewer to be able to make sense of the various ways people describe themselves in résumés. No standardization leaves the onus of making associations between various titles, companies, skills, and accomplishments on the résumé reviewer.

A need exists for better communication within the hiring industry between employers and job seekers. In the current state of the industry, communication suffers from several complications. One such complication is the non-deterministic definition of industry specific terms. For instance, terms like "executive", "manager", and "administrator" are subjective and can mean different things within different industries or even at different companies within the same industry. Furthermore, when a hiring manager reviews a résumé and sees these terms, the hiring manager and the job candidate may have different definitions of these terms based on their own unique experiences. Misconstrued meaning of terms can result from job titles previously held by a candidate, duties a candidate has performed, and skills a candidate claims to have. Also, chosen keywords can be used inappropriately, for example, in ways that are inconsistent with industry accepted definitions. Another communication pitfall occurs by a lack of industry standard terms for describing unique combinations of skills and experiences.

Another common problem within the hiring industry stems from an inadequate amount of domain knowledge on the part of a human resources administrator or department manager when choosing a candidate for a job. Rapid development of various industries coupled with the improbability of an individual's familiarity with all aspects of a job leaves many people in a position to hire with insufficient knowledge and/or experience to perform a meaningful evaluation of a candidate's qualification for a given job. Additionally, many hiring decisions are not made from merit at all but are rooted in personal bias and/or social, political, or psychological factors. Inability to make judgments regarding the qualification of a candidate due to lack of domain knowledge, further clouded by biases, convolute the hiring process and/or precipitate economic losses.

The common model for performing the actual matching between entities and targets represents items in entity sets and target sets based on a set of prescribed properties and then measures the similarity of items between two sets in terms of the similarity of these properties.

Most existing systems force their user to either hand curate these properties or adhere the representation of their items to prescribed set of properties. This is usually a manual process which is also sometimes referred to as concept-based representation of entity or target items.

There is a great deal of work in information retrieval community that focuses on automatic extraction of abstract representation in terms of semantic concepts. These methods are generally known as "Explicit Semantic Analysis" ("ESA"). ESA builds abstract representation of items in concept spaces.

Some tools exist that analyze text within a job description on the surface to help predict what kinds of applicants might respond. Alternative HR tools present candidates based on keywords or attributes that the user is required to understand before they began their search. These systems do not understand or interpret the meaning of those keywords as they relate back to the job description. Their typical result is an ordered list with no verification of relevant quality to properly order them. If the hiring manager were utilizing this type of alternative HR tool he/she would be picking an arbitrary place to start when reviewing candidates. There is no way to guarantee that there is any quality in the first candidates that get reviewed. This can lead to wasted time and effort.

SUMMARY OF THE INVENTION

To solve the above and related problems in the prior art, embodiments of this invention incorporate novel machines, systems, methods and techniques involving semantic representation of text in terms of a natural language knowledgebase; where "semantic representation" implies a machine-comprehensible representation of the concepts embodied or latent within a text; and a "natural language knowledgebase" implies a collection of knowledge related to a task and existing in a human readable and writeable form. Other embodiments provide for the determination of a relatedness metric of an information source, for example the text of a document, to an ontologized lexicographic knowledge base in order to produce a conceptual representation of the document which then is used to determine its meaning within the context of an arbitrary and/or predefined corpus.

An embodiment of this invention further involves the generation of dynamic definitions of job titles and/or industry terms based on crowd-sourced natural language data. These dynamically generated and thus newly "standardized" definitions are utilized by the present invention to produce an automated system and/or metric for evaluating the qualification of a candidate for a job position. Embodiments of the invention provide a mechanism which can apply such a standardized method of defining the experiences and qualifications of a candidate which is not necessarily tethered to, and does not depend upon specific keywords.

Utilizing these methods, embodiments of the present invention may produce evaluations of the qualification of a candidate without the necessity of human interaction, and even if using a natural language résumé and associated job posting or description as its input. In this context, by use of embodiments of the present invention, human inadequacy and/or bias are effectively removed from the hiring process. Also, labor costs can be substantially reduced because the remaining role of a human operator of such a system is radically simplified to maintaining the system and taking advantage of the results, thereby enhancing efficiency and productivity. Results may be combined with human intuition after an objective evaluation of qualification has been established and recorded.

Embodiments described include semantic comparison methods to ascertain the conceptual relatedness and methods and systems to utilize conceptual relatedness between information sources expressible in natural language at a primary or first order level. The natural language may be utilized in text readable form, machine readable form, directly spoken form, recordable spoken language, and digital derivatives of microprocessor processed text, machine readable, or recordable natural language accessible from data storage systems, and/or any combination of the foregoing. The methods include converting natural language of a first information source to a first concept vector and converting a second information source to a second concept vector. The concept vectors may be presentable in the form of a concept map, that is, a first concept map and a second concept map. The first and second concept vectors or concept maps are then determined for similarity and the similarity is preferably calculated as a metric representing the degree of relatedness between the first information source and the second information source. The metric that is calculated may be obtained from mathematical treatments appropriate for vector analysis, or from other sources. The calculated metric may be presentable in a plurality of forms, including at least one or more of concept relevance score, a conceptually weighted score, a word pool, a graphical representation signifying the evidence of relatedness between the first and second information sources. The calculated metric may also be overlaid or associated with the first or second information sources as a heat map for the relatedness of specified terms in the first or second information sources.

Other embodiments described include semantic methods to ascertain the relatedness between information sources expressible in natural language at a secondary or higher order level employing a natural language database and plurality of corpus sources, either as intact corpus entities or natural language segments or portions thereof. The natural language similarly may be in text readable form, machine readable form, directly spoken form, recordable spoken language, and digital derivatives of microprocessor processed text, machine readable, or recordable natural language accessible from data storage systems. The methods may include converting natural language of a first information source to a first concept vector and converting a second information source to a second concept vector. The concept vectors may be presentable in the form of a concept map, that is, a first concept map and a second concept map. The first and second concept vectors or concept maps are then denominated the first order of the first concept map, which are then converted to a second order of the first concept map by comparison to a concept knowledge base. Thereafter, determination for similarity is calculated as a metric representing the degree of relatedness between the first information source and the second information source at the second order. The metric that is calculated may be obtained from mathematical treatments appropriate for vector analysis, or from other sources. The calculated metric may be presentable in a plurality of forms, including at least one or more of a concept relevance score, a conceptually weighted score, a word pool, a graphical representation signifying the evidence of relatedness between the first and second information sources. The calculated metric may also be overlaid or associated with the first or second information sources as a heat map for the relatedness of specified terms in the first or second information sources.

Yet other embodiments described include semantic methods of a reiterative nature to ascertain a more exacting relatedness between portions or segments of an information source that are expressible in natural language yet at higher order levels employing a natural language database and plurality of corpus sources, either as intact corpus entities or natural language segments or portions thereof, for which the portions of natural language classified into segments are weighted. The segments or portions of the natural language similarly may be in text readable form, machine readable form, directly spoken form, recordable spoken language, and digital derivatives of microprocessor processed text, machine readable, or recordable natural language segments accessible from data storage systems. The method includes classifying segments the natural language of a first information source then converting at least one or more of the natural language segments into a first concept vector. Alternatively, if more than one segment is classified, the method provides for converting the segments into a plurality of first concept vectors or first concept maps and converting a second information source to a second concept vector. The concept vectors may be presentable in the form of a concept map, that is, a first concept map and a second concept map. The first and second concept vectors or concept maps are then determined for similarity and the similarity is calculated as a metric representing the degree of relatedness between the first information source and the second information source. The metric that is calculated may be obtained from mathematical treatments appropriate for vector analysis, or from other sources. The calculated metric may be presentable in a plurality of forms, including at least one or more of a concept relevance score, a conceptually weighted score, a word pool, a graphical representation signifying the evidence of relatedness between the first and second information sources. The calculated metric may also be overlaid or associated with the first or second information sources as a heat map for the relatedness of specified terms in the first or second information sources. The calculated metric rates the quality and substance of a job description and matching job résumés, and/or their relatedness.

BRIEF DESCRIPTION OF THE DRAWINGS

Preferred and alternative examples of the present invention are described in detail below with reference to the following drawings:

FIG. 12 depicts a webpage offering instructions to guide a hiring manager while writing a job description using an overlaid heat map utilizing the methods described in FIGS. 1A-3;

FIG. 14 depicts a webpage dashboard of job position applicants have undergone or undergoing the analysis by the methods described in FIGS. 1A-3;

FIG. 15 depicts a webpage dashboard with an overlay of user adjustable criteria to allow re-ranking of job position applicants via the methods described in FIGS. 1A-3 using the weighted values of the user-adjusted criteria;

FIG. 16 depicts a webpage dashboard of a ranking summary for an applicant overlaid with a heat map of the relevance of applicant's experience for the job position's requirements.

DETAILED DESCRIPTION OF THE PREFERRED EMBODIMENT

Preferred and particular embodiments of the invention involves the application of semantic characterization and retrieval techniques to relate the text of a document to an ontologized lexicographic knowledge base in order to produce a conceptual representation of the document which can be used to determine its meaning within the context of an arbitrary corpus.

Figure 1A:
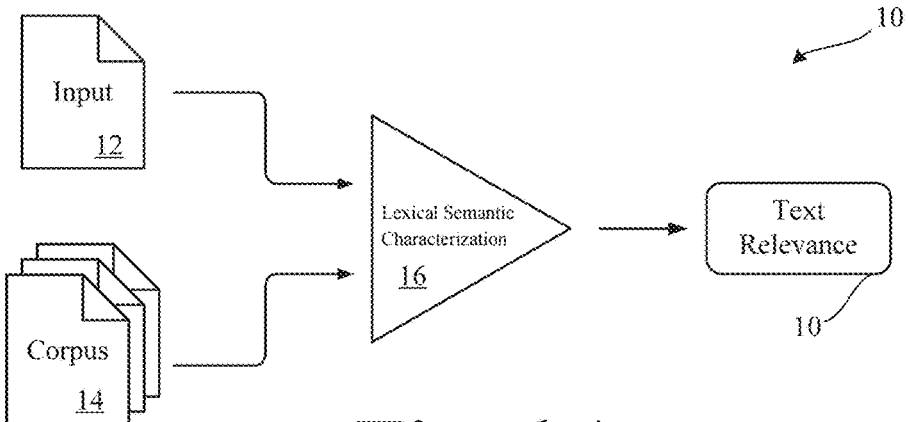
FIG. 1A depicts a Text Relevance Generator configured as a machine and/or method to obtain a metric of a primary order signifying the text relevance between two information sources.

Preferred and particular embodiments of the invention and described with references to the figures described below:

FIG. 1A depicts a Text Relevance Generator 10 configured as a method to obtain a metric of a primary order signifying the text relevance between two information sources. The Generator 10 provides for entry of at least a portion of a first information source as Input 12 that is compared for text comparison with a second information source as Corpus 14, both the Inputs 12 and the Corpus 14 being processed within a Lexical Semantic Characterization 16. The Lexical Semantic Characterization process 16 represents the interaction with a no-SQL or nonSQL database. The output from the Lexical Semantic Characterization is a Text Relevance 18 that signifies the text frequencies common to the Input 12 and Corpus 14.

Particular embodiments for processing by the Text Relevance Generator method 10 would be the Input 12 representing a job posting and the Corpus 14 representing at least one or more résumés, that is, a collection or plurality of résumés. The output of Generator 10, the Text Relevance 18, would represent the text frequency of a collection of résumés have with a particular job posting. Thus Text Relevance Generator 10 provides the method by which text frequency between a set of entities, say "job descriptions", and a set of targets, in this case résumés of "job candidates", can be determined.

Figure 1B:
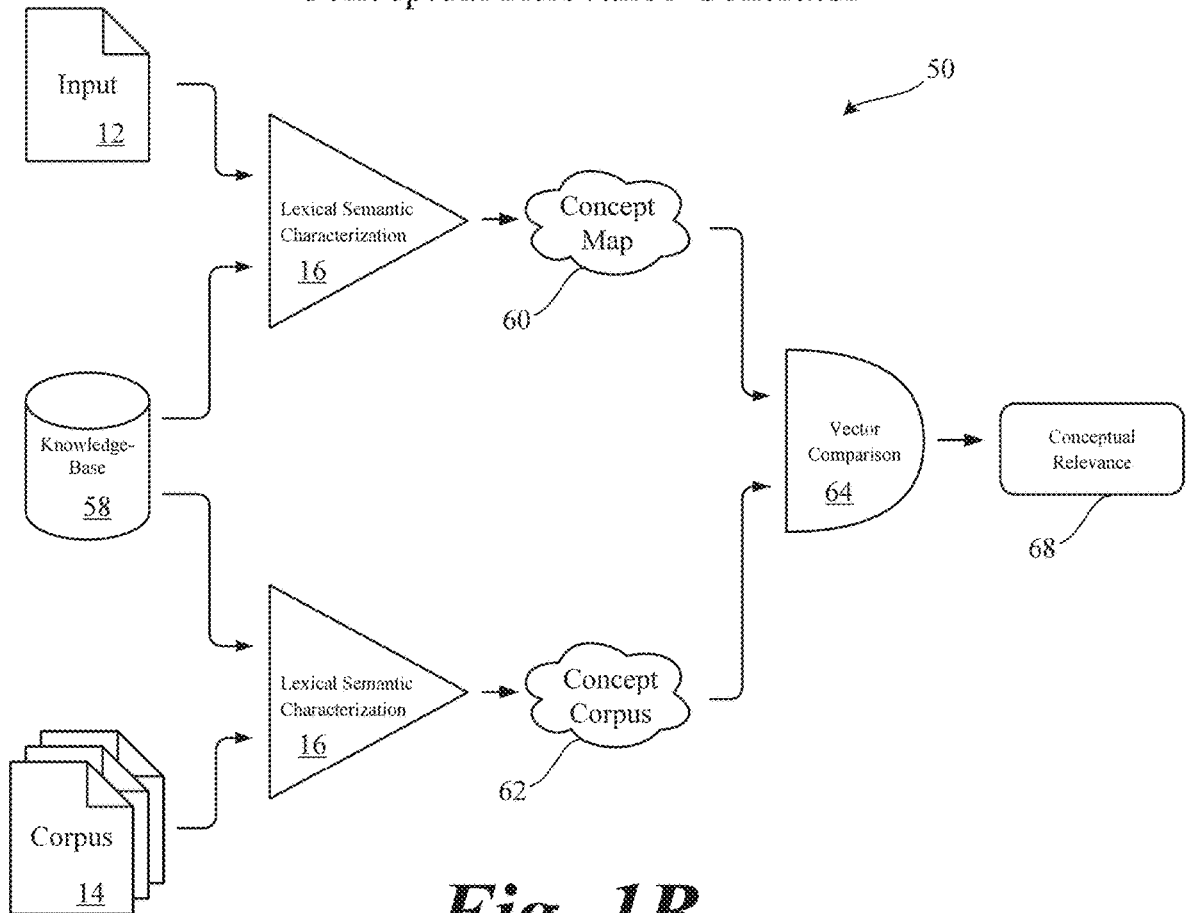
FIG. 1B depicts a Conceptual Relevance Generator configured as a machine and/or method to obtain a metric of a second order signifying the conceptual relevance between two natural language sources in view of a knowledge base.

FIG. 1B depicts a Conceptual Relevance Generator 50 configured as a method to obtain a metric of a second order signifying the conceptual relevance or meaning relevance between two natural language sources in view of an information database. The basic process involves obtaining higher order semantic concept comparison as related to Abstract Semantic Analysis of Natural Language Text Using the Notion of Higher Order Conceptual Knowledge bases. The Generator 50 provides for entry of at least a portion of the first information source as Input 12 that can be compared for meaning comparison with a Knowledge Base 58 containing a store of natural language files. The Knowledge Base 58 comprises an ontologized lexicographic knowledge base. Both the Input 12 and at least a portion of the files contained within the Knowledge Base 58 are within the Lexical Semantic Characterization 16, and as previously discussed above, the Lexical Semantic Characterization process 16 represents the interaction with a no-SQL or nonSQL database. The output from the Lexical Semantic Characterization 16 is a vectorized Concept Map 60. In parallel, at least a portion of the files stored in the Knowledge Base 58 are compared with the second information source or Corpus 14 within the Lexical Semantic Characterization 16, the output from which is the vectorized Concept Corpus 62.

The Conceptual Relevance Generator 50 depicted in FIG. 1B also may utilize Semantic Representation of Text in Relation to a Natural Language Knowledgebase. This embodiment or aspect of the invention converts natural language text into a semantic representation of that text referred to herein as a concept vector space. Once converted into this space, abstract comparisons between documents may be performed on a semantic "content-to-content" basis as opposed to a "text-to-text" basis.

According to a preferred embodiment, one functionality of the method is realized by a two-step process which may rely on the presence of a human knowledge base comprised of natural language texts relating to a topic; e.g., an ontologized lexicographic knowledge base. FIG. 1B depicts this process in contrast to a typical method of text comparison. The diagram first shows the typical one step method, and then the two step method presented here which may rely on the presence of an ontologized lexicographic knowledge base. The "Lexical Semantic Characterization" process depicted represents the interaction with a no SQL database as previously described.

In the first step, standard document search methods such as Term Frequency/Inverse Document Frequency or other semantic algorithm may be applied using the corpus texts as a query to search the knowledge base and, for each sample text within the given corpus, score the cataloged texts of the knowledge base based on their relevancy to the given corpus sample text. The cataloged texts of the knowledge base may be referred to as "Concepts" and the strength of the relationship between a sample text and these concepts may be referred to as a "Concept Vector Space" or "Concept Map". The Concept Map constitutes a machine readable representation of the conceptual substance of the sample text.

In the second step, the Concept Map generated for an arbitrary input text may be compared with the concept map of each sample text within a corpus to produce a conceptual relevance score defining the conceptual relationship between the input text and any corpus text.

As a result of the foregoing two steps, preferred embodiments enable a novel and useful "second order concept"-based comparison of texts using an intermediate natural language knowledgebase which solves many of the previously described problems of the prior art.

Figure 2:
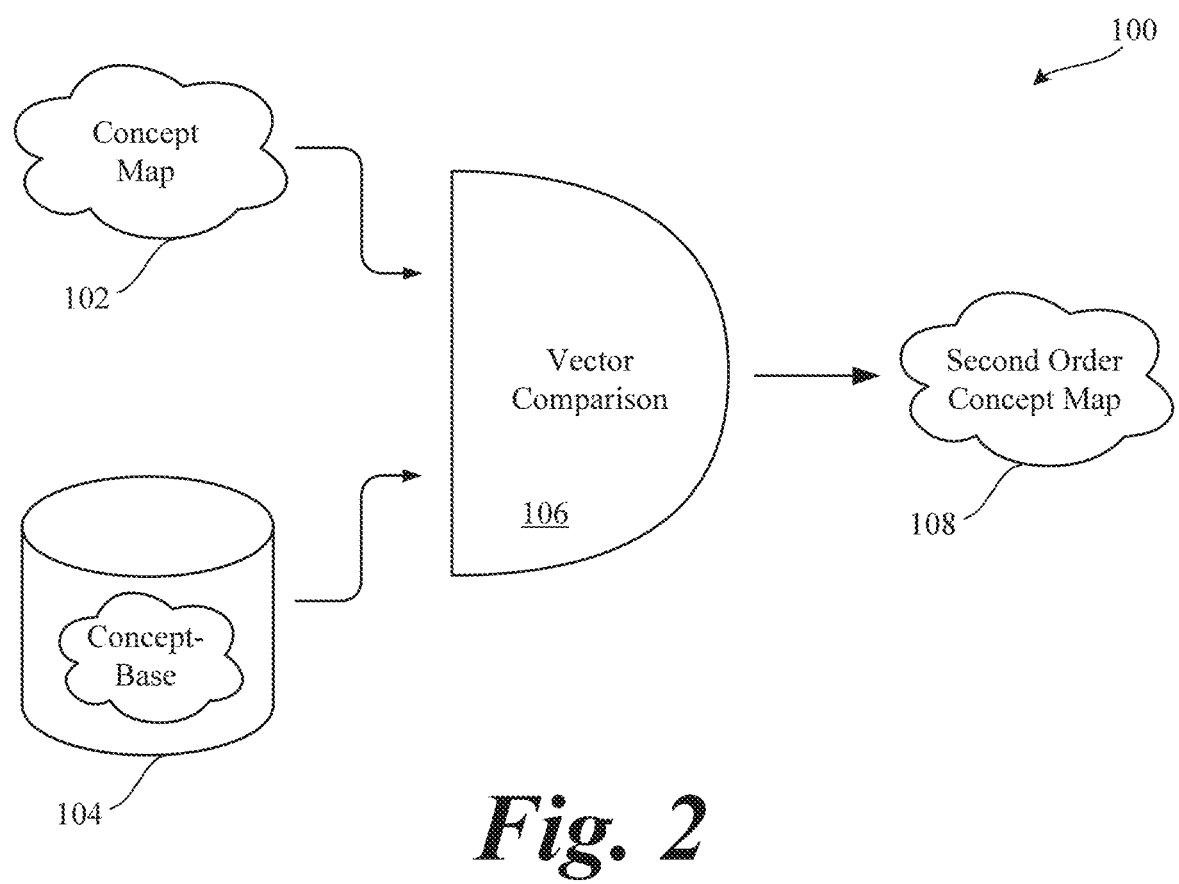
FIG. 2 depicts a Second Order Concept Map Generator, configured as a machine and/or method to obtain a second order vector or concept map between two information sources.

FIG. 2 depicts methods of a second order concept map generator 100 in which a first order concept map 102 can be converted to a second order concept map 108 by comparison to a concept knowledge base 104. By utilization of Abstract Semantic Analysis of Natural Language Text Using the Notion of Higher Order Conceptual Knowledgebase, semantic representation of text in relation to a natural language knowledgebase by applying a similar process to text that has already been converted to the concept vector space. By doing so, higher levels of abstract relationships can be identified.

Figure 3:
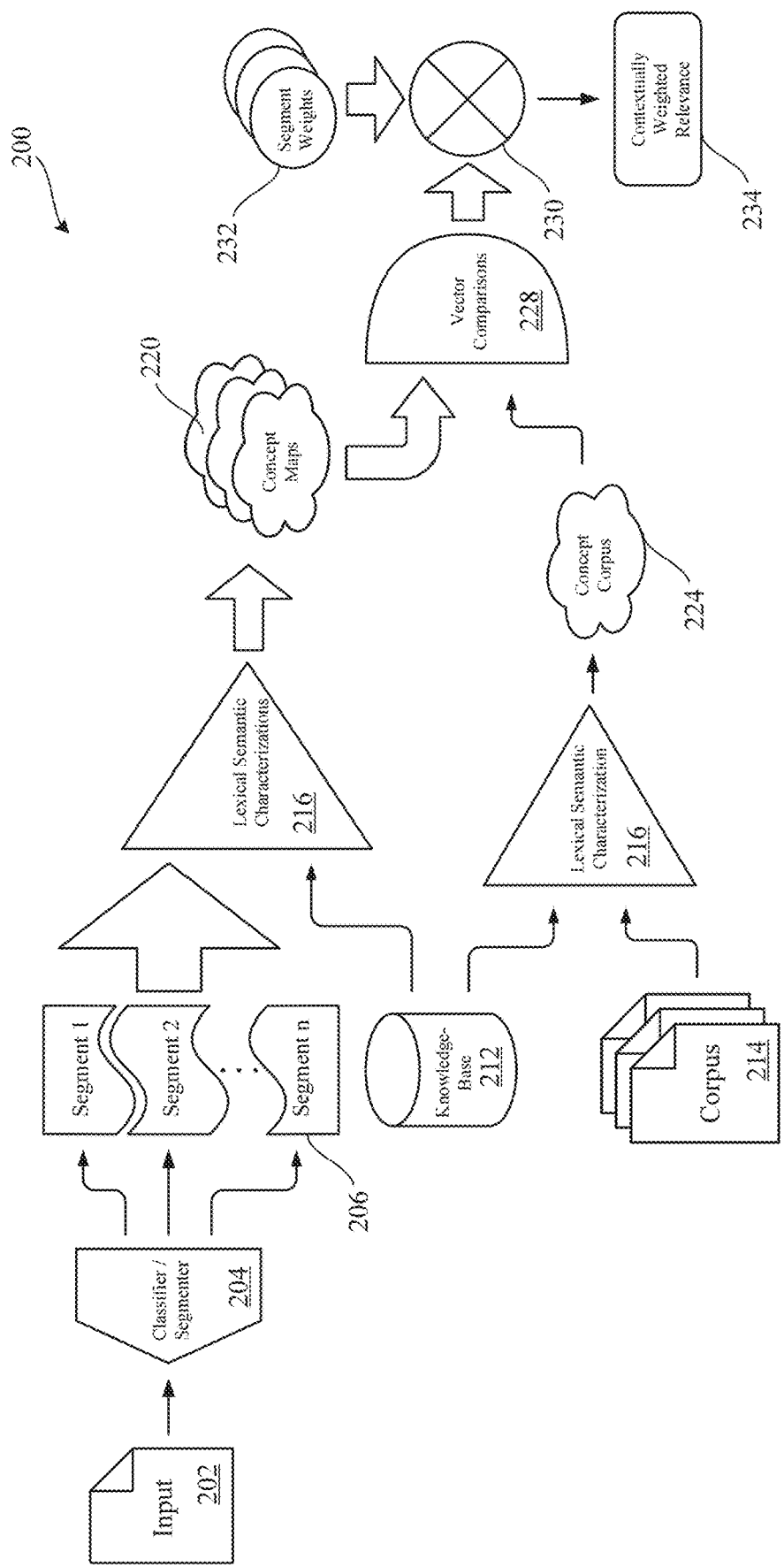
FIG. 3 depicts an example implementation of Dynamic Adjustment of Analytical Methods Based on Semantic Context where different segments of a document can be assigned different weights based at least in part or solely on their semantic content when determining overall relevance of the document to a corpus.

FIG. 3 depicts a method of a contextually weighted relevance generator 200 that applies a Dynamic Adjustment of Analytical Methods Based on Semantic Context. This aspect of the invention provides a method for granular analysis of natural language text where by a document can be first divided into sections based on semantic content and each section is analyzed uniquely based on the category of the content. This allows for document comparisons using Semantic Representation of Text in Relation to a Natural Language Knowledgebase to weight the contribution of specific content differently depending on the desired result.

The contextually weighted relevance generator 200 depicted in FIG. 3 can be generated by two sub-algorithms. In the first algorithm an input information source 202 this subjected to a segmenter 204 to produce a plurality of information segments 206. The segments 206 are depicted from segment-1 to segment-n. Together with a second information source, a knowledgebase 212, the segments 206 are ontologically compared and vectorized via the lexical semantic characterization 216 and outputted as concept maps 220. In parallel, a third natural language source in the form of a document corpus 214 is also ontologically compared with the knowledgebase 212 and vectorized via the lexical semantic characterization 216 for subsequent output as a concept corpus 224. In the second algorithm the Concept maps 220 and the concept corpus 224 are further vectorized in the Vector comparison block 228. Results of this re-vectorization are outputted as a segment vector plurality 230. The vector plurality 232 is then modified by segments weights 232 and outputted as contextually-weighted relevance 234.

Figure 4:
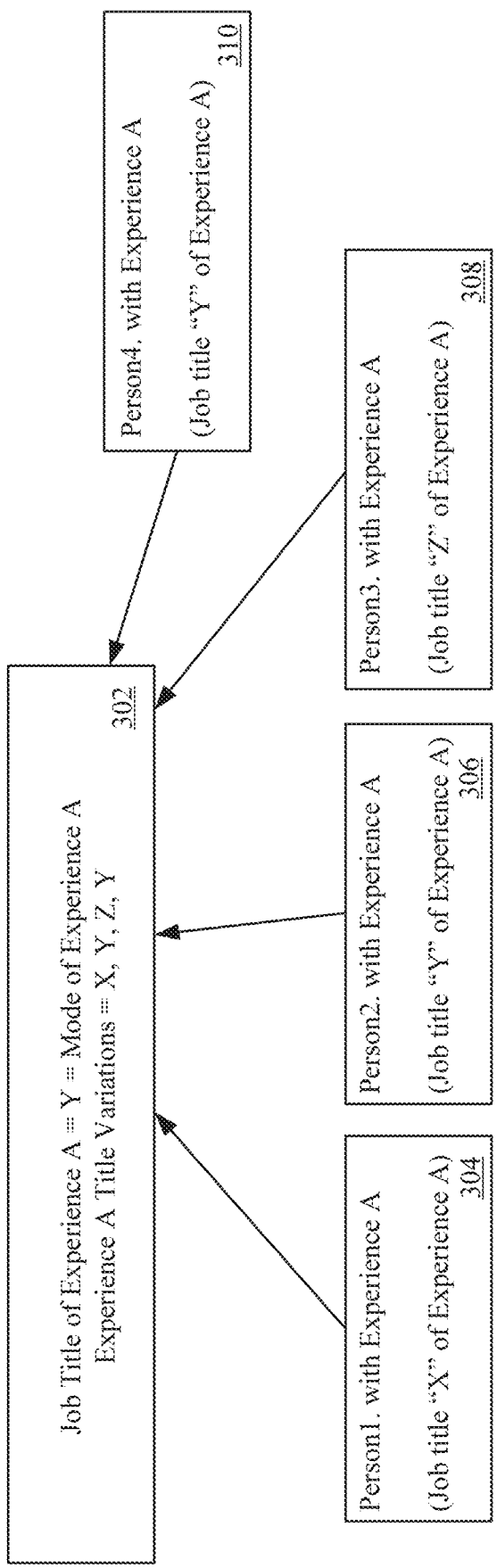
FIG. 4 depicts how varying job titles of the same job position can be combined based at least in part based on expressed experience to define the correct title of said position.

FIG. 4 depicts a representation chart showing how varying job titles of the same job position can be combined to define the correct title of the job position. For example, Person-1 with Experience-A 304 presents job title "X", Person-2 with Experience-A 306 presents job title "Y", Person-3 with Experience-A 308 presents job title "Z", and Person-4 with Experience-A 310 presents job title "P". Thus for person entities 304, 306, 308, and 310 each having the same experience "A" but differently labeled with different titles, X, Y, Z and P, respectively as shown in Experience A Title Variations 312 box.

Figure 5:
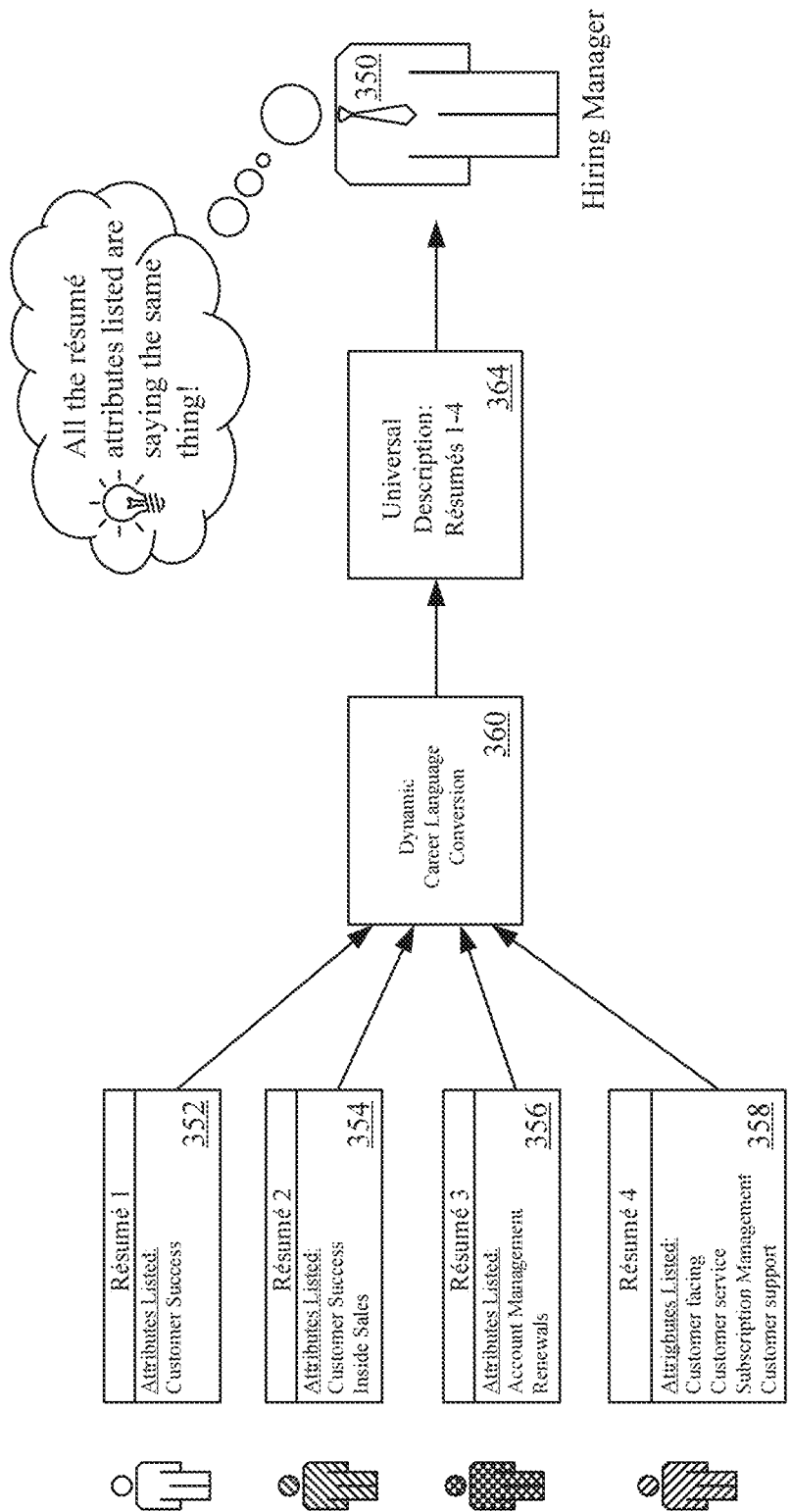
FIG. 5 depicts how résumés with differing descriptions can be converted through a process that puts them into a common description which can be better understood by a hiring manager.

FIG. 5 graphically depicts how résumés with differing descriptions can be converted through the methods described in FIGS. 1A-3 that integrates them into a dynamic description which can be better understood by a user, say a hiring manager 350. Dynamic descriptions concern more higher level abstract terms favored in the career-research and career-developing industries. Accordingly, in a Dynamic Career Language the meanings or concepts of vectorized portions of the natural languages are more objective and relevant. Thus, resultant dynamic career languages will be sought after by hiring managers to make better matches by reducing the reliance on ill-defined primary text-matching terms that are too subjective and tend to make unsuitable matches. Dynamic career languages facilitate better communication between a recruiter and hiring manager as well as a job candidate and the company which in turn streamlines the hiring process. This specific embodiment of the invention also allows for the ability of unskilled recruiters to locate and source candidates without true knowledge of how that candidate is representing themselves on their résumé as it relates back to the needs of the hiring manager.

Referring to FIG. 5 the hiring manager 350 is faced with the problem of reviewing four résumés, Résumé-1 in résumé box 352, Résumé-2 in résumé box 354, Résumé-3 in résumé box 356, and Résumé-4 in résumé box 358. Each résumé has a different sets of attributes listed. For résumé box 352 the attributes listed include customer success, for résumé box 354 the attributes listed include customer success and inside sales, for résumé box 356 the attributes listed include account management and renewals, and for résumé box 358 the attributes listed include customer facing, customer service, subscription management, and customer support.

These different sounding attributes among the four résumés, however, upon being processed by the machines and according the methods described in FIGS. 1A-3 undergo vectorization within the Dynamic Career Language Conversion box 360 and the meanings or concepts obtained impart a dynamic description as shown in the Universal Description: Résumé s 1-4 box 364. Upon reviewing these automatically generated dynamic universal descriptions of the attributes for Résumé s 1-4, in a manner not possible with prior art systems, the hiring manager 350 can objectively conclude that "all the résumés attributes are saying the same thing!"

Figure 6:
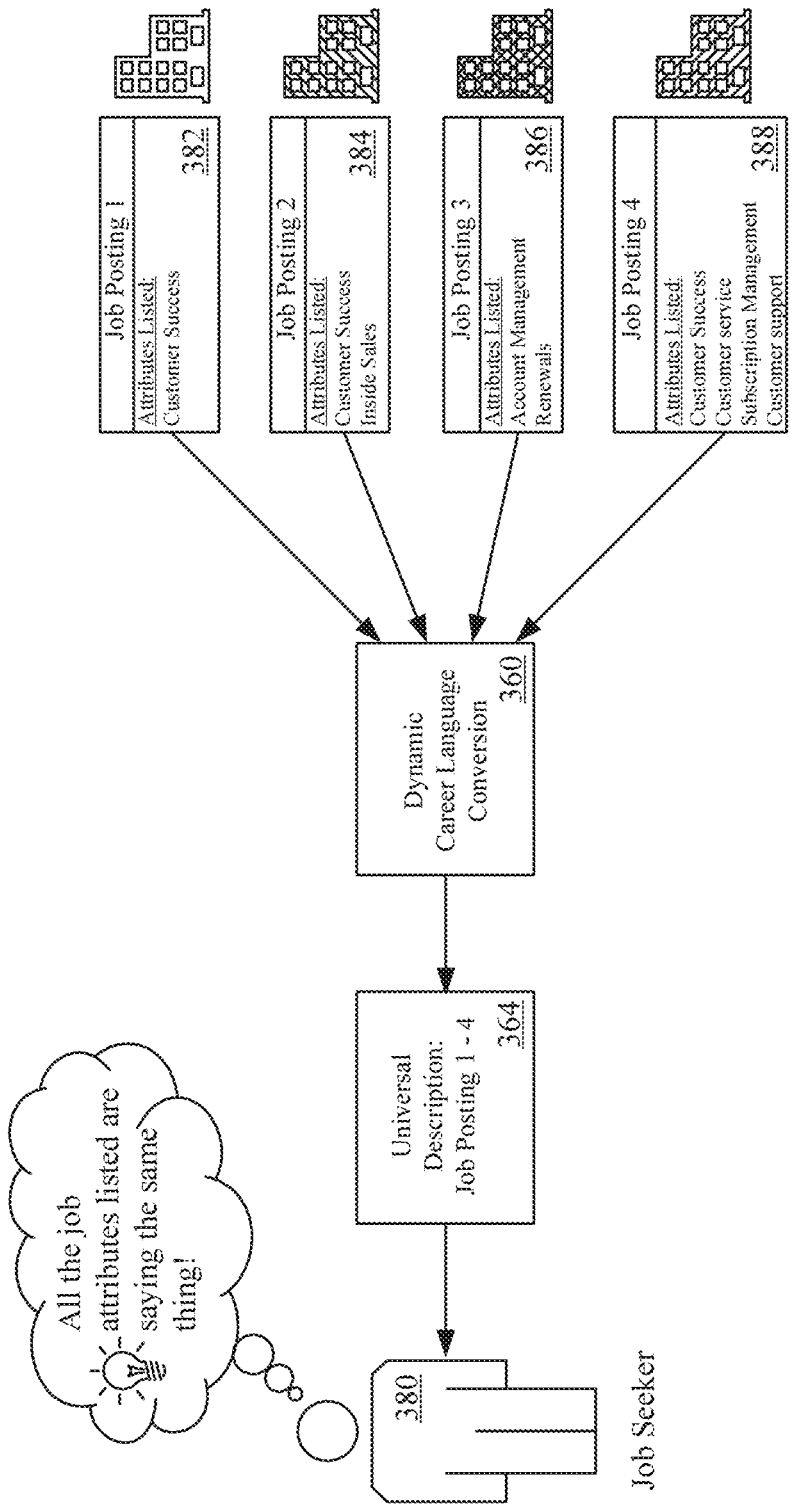
FIG. 6 depicts how job postings with differing descriptions can be converted through a process that puts them into a common description which can be better understood by a job seeker.

FIG. 6 graphically depicts how résumés with differing descriptions can be converted through the machines and methods described in FIGS. 1A-3 that integrates them into a dynamic description which can be better understood by a user, say a job seeker 380. Here the job seeker 380 is faced with the problem of reviewing four job postings, Job Posting-1 in Job Posting box 382, Job Posting-2 in Job Posting box 384, Job Posting-3 in Job Posting box 386, and Job Posting-4 in Job Posting box 388. Each job posting has a different sets of attributes listed. For Job Posting box 382 the attributes listed include customer success, for Job Posting box 384 the attributes listed include customer success and inside sales, for Job Posting box 386 the attributes listed include account management and renewals, and for Job Posting box 388 the attributes listed include customer success, customer service, subscription management, and customer support.

These different sounding attributes among the four job postings, upon being processed according the machines and methods described in FIGS. 1A-3, undergo vectorization within the Dynamic Career Language Conversion box 360. The meanings or concepts obtained impart a dynamic description as shown in the Universal Description: Job Posting 1-4 box 364. Upon reviewing these dynamic universal descriptions of the attributes for Résumé s 1-4, in a manner not possible with the prior art, the hiring manager 350 can now objectively conclude that the "all the job attributes listed are saying the same thing!"

Figure 7:
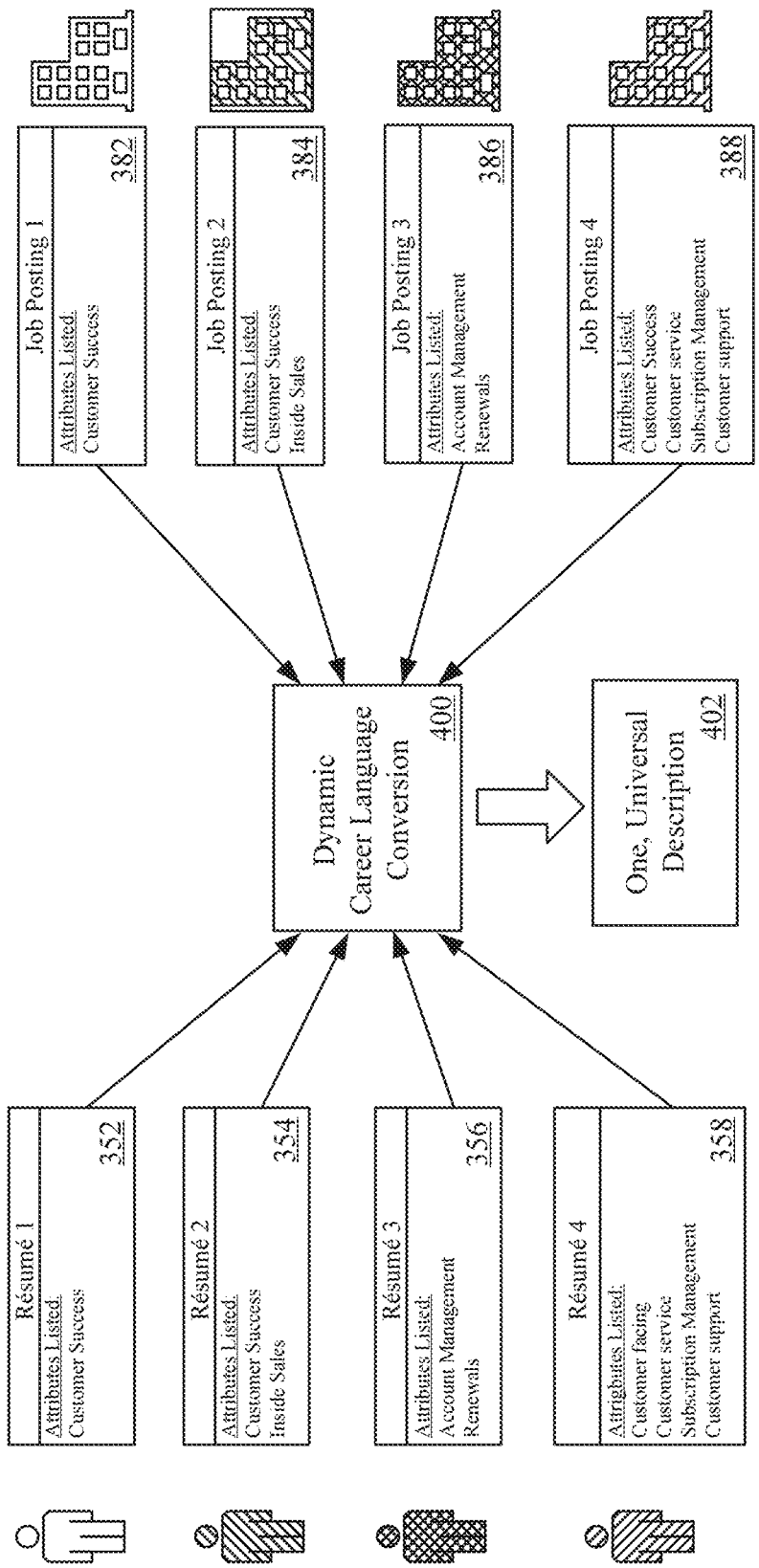
FIG. 7 depicts how résumés and job descriptions can be described in the same common language even though they are used differently by opposite parties.

FIG. 7 depicts how résumés and job descriptions can be translated and described in the same common language even though they are used differently by opposite parties. When the attributes listed in Résumé s 1-4 in Résumé s boxes 352-358 and the Job Postings 1-4 in Job Posting boxes 382-388 are subject to the Dynamic Career Language Conversion method 400 that utilizes the machines and methods described in FIGS. 1A-3 above, as shown in One Universal Description box 402, higher domain and more meaningful descriptions can be obtained.

Dynamic Career Language

A candidate who has held one type of job in one particular industry and then a second job in an extremely different industry may appear to be qualified for either job based on their experiences. However, jobs may exist which specifically require this unique combination of experiences. A new job for which there is no industry established standard definition. Currently, a hiring manager must be experienced enough and insightful enough to identify this combination of skills when it is not explicitly stated or summarized with its own terms and definitions.

Dynamic Career Language is such a means of defining a candidate, not by the specific titles they claim to have held, or by the specific skill keywords stated on a résumé, but rather how the candidate describes the work they have done within the entire body of a résumé. Dynamic Career Language also allows for the definition of a position at a company, not by a title, but rather by a description of the type work an individual in that position would be expected to perform. This abstract definition captures the essence of a candidates qualifications in relation to a given job description and allows for generation of new identifiers to define a unique collection of skills and experiences for which no industry standard definition exists.

Generation of Dynamic Career Language is accomplished by utilization of methods such as Semantic Representation of Text in Relation to a Natural Language Knowledgebase to create a representation of a job title or term which can grow dynamically and be used to determine whether a given natural language text fits the description of a title. FIG. 4 shows how many individuals with similar experience but different job titles may be given the same title based on their common experience. The diagram also shows that various titles used by these individuals may be identified as variations of the same root title.

Consider numerous job applicants with essentially the same experience and qualifications but who each describe themselves in different ways. FIG. 5 illustrates this scenario. Dynamic Career Language provides a means for the hiring manager to identify all candidates in the group by a common title based on the conceptual substance of the résumés and not by the specific titles or skills each candidate claims.

This process may also be reversed. FIG. 6 illustrates a scenario in which a job seeker is evaluating several job posting which are all effectively for the same sort of job, but all describe that job in different ways. Framing the language of job postings and résumés into common terms eliminates miscommunication and brings trust, accuracy, and efficiency to the hiring process for the benefit of companies and the workforce. This common language is universal within the context of hiring regardless of whether describing a résumé or a job posting.

Figure 8:
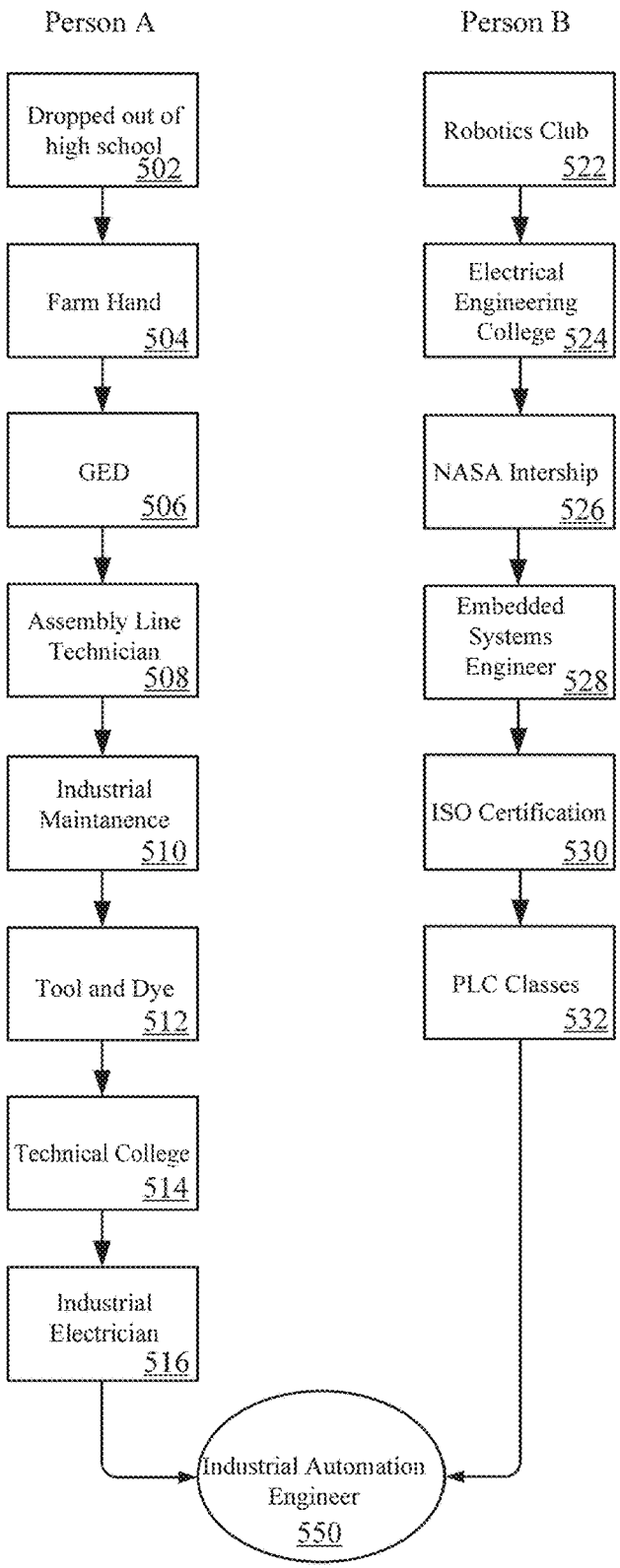
FIG. 8 depicts an example of the utility of Career Threading by examining the different career paths of two hypothetical individuals in the same job position.
Figure 9:
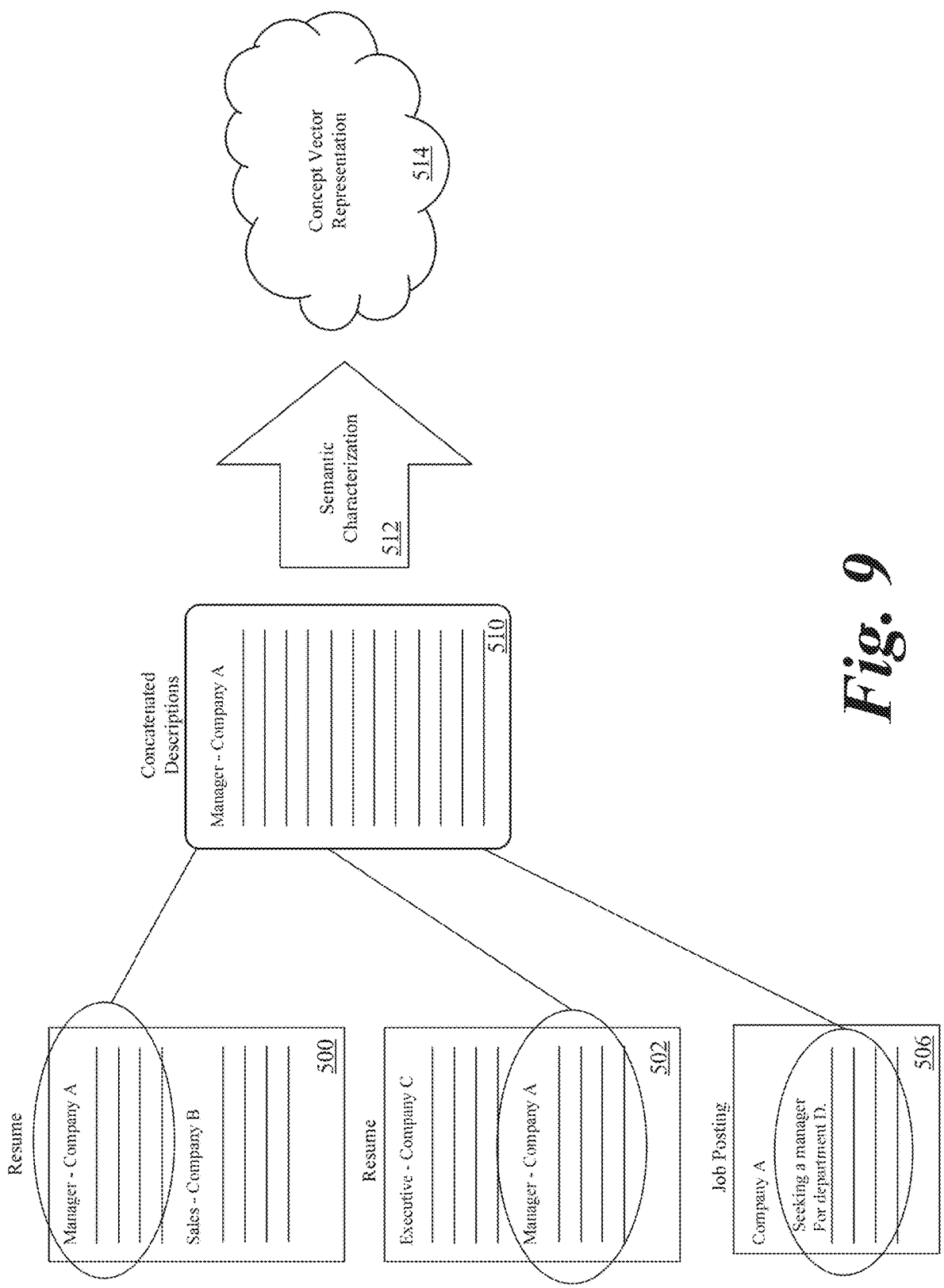
FIG. 9 depicts the process of using Crowd-sourced Résumé Descriptions to produce an implementation of Dynamic Career Language.
Figure 10:
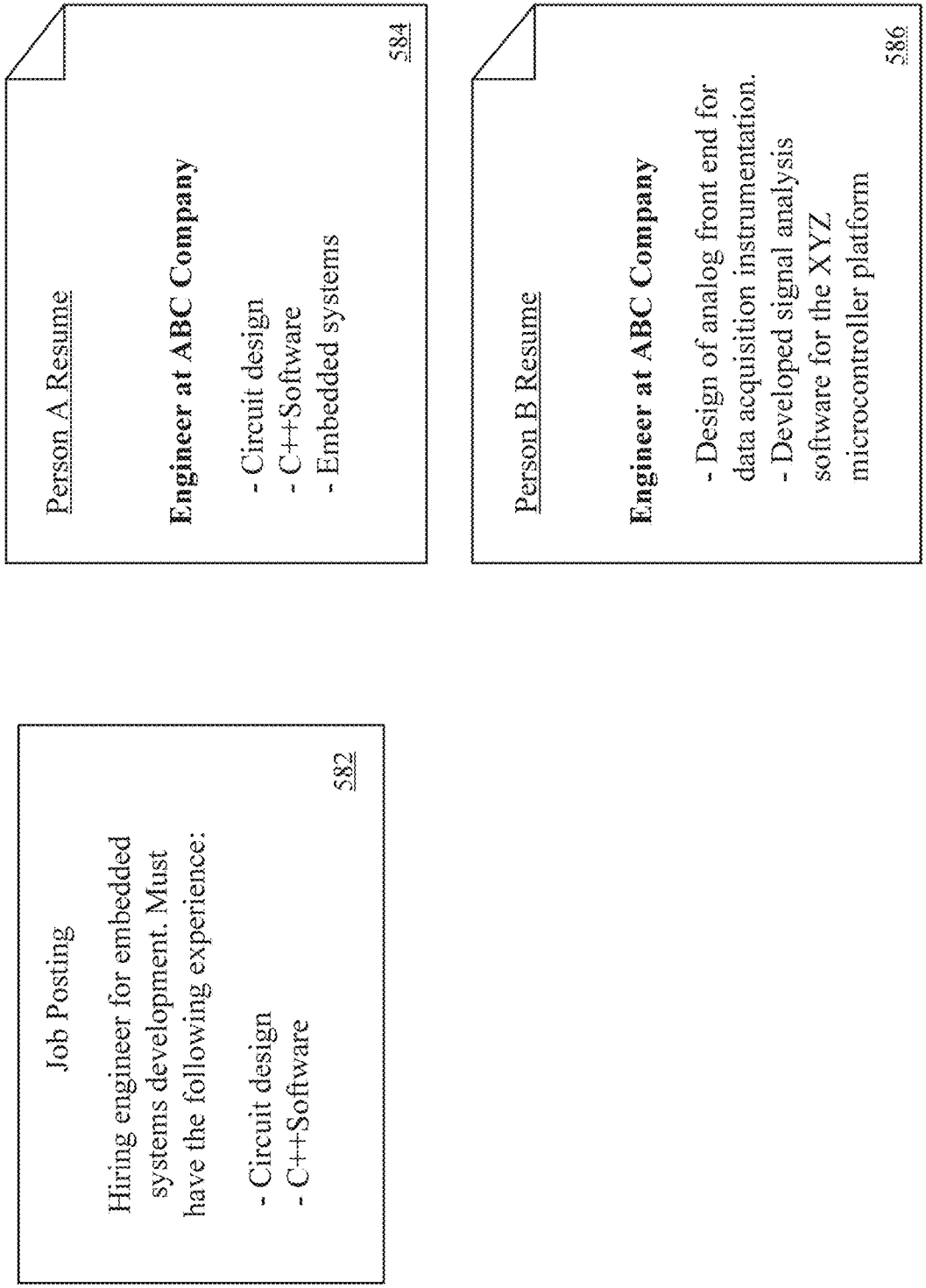
FIG. 10 depicts an example of how the résumés of two hypothetical job applicants might be compared using Crowd-sourced Résumé Validation Score.

FIGS. 8-10 depict an example of the utility of applying the dynamic career conversion method 400 of FIG. 7 to illustrate how two individuals are matched for a job posting. Career threading is a term used to show how different career paths of two hypothetical individuals, Person A, and Person B, would be, at least initially, be qualified for the same position.

As shown in the diagram of FIG. 8, the résumé for Person-A's career path includes dropping out of high school at box 502, becoming a farm hand at box 504, passing the GED exam in box 506, working as an assembly line technician in box 508, and performing industrial maintenance at box 510. Thereafter, Person-A worked in a tool and dye profession at box 512, then went to technical college at box 514, and become an industrial electrician at box 516. Person-A was deemed to be a match for a job posting for an Industrial Automation Engineer at oval 550. The résumé for Person-B's career path was different and shorter. Person-B worked at a Robotics Club in box 522, went to an Electrical Engineering College at box 524, became an NASA intern at box 526, and worked subsequently as an embedded systems engineer at box 528. Thereafter Person-B worked to receive his ISO certification at box 530, and took PLC classes at box 532. Person-B was also deemed to be a match for the same job posting for an Industrial Automation Engineer at oval 550.

Career Threading. An embodiment of this invention allows a person in the workforce to explore the qualifications required by a particular job position and the career paths commonly taken to achieve that position. It also allows for advanced comprehension of the interrelationships of different careers and industries.

An application of these methods described in FIGS. 1A-3 includes creating a database of career fields and related job titles with which a person seeking employment could use to explore jobs for which they qualify based on their résumé. For example, a job seeker would input their résumé into the system described in FIG. 11 describe below utilizing the methods described in FIGS. 1A-3 described above as a query. The system would produce ranked lists of job titles relevant to them, grouped by specific industry. Such a system would form the basis of Career Threading and embody elements of Dynamic Career Language Embodiments of the invention as described above provide methods to explore the specific skill and experience requirements to perform in a given job role. Using Career Threading, an individual may analyze their current work experience, education, and skills, and clearly understand what attributes they might be lacking to engage in a particular career path. An embodiment of this invention may provide some information which could otherwise be gleaned from consultation with a career counselor but relies on present inventions such as Crowd Sourced Résumé Descriptions and Dynamic Career Language to lend insight which reflects the immediate state of the industry, is based on real data and analysis as opposed to opinion and speculation of an individual, and expertly covers a wide range of domains. Not only can an individual realize the skills and experiences they need to acquire to perform adequately in a given job position, Career Threading also allows the individual to explore the common paths others have taken to arrive in that position. The individual can see previous jobs that others in the target position have held and can be shown the specific skills those people acquired from those positions which contribute to their ability to perform the given job. Any person entering the work force or seeking a new job at any level could use a Career Threading implementation to gain invaluable insight into their target industry which is not available through any existing means.

Career Threading examines the work history of millions of people and traces the specific skills and experiences they have gained which led them to their current position. Work history and skills data from people holding the same job position are combined to present a picture of popular and alternative career paths to achieve a target position. In this way, an individual may plan a career and be better prepared for work in a specific industry. Such a tool would find utility for advising students on areas of study to focus on as well as guide choices of specific experience such as extracurricular activities, membership in specific organizations, or internships. Career Threading may also serve to educate hiring managers in understanding the sorts of work experience and skills to look for when reviewing a candidate for a job. FIG. 8 depicts an example in which two individuals share the same job positions but come from completely different backgrounds. Career Threading allows a job candidate or a hiring manager to understand the basic skills required to perform a job and see how different backgrounds contribute to the development of those skills.

Additionally, Career Threading provides a method of seeing the relationships between various jobs; how they are similar and how they are different. Career Threading allows for the construction of career ontologies which assist in data driven analysis of a nation's economy and workforce distribution, business analytics, and identification of social trends.

FIG. 9 depicts the process of using Crowd-sourced Résumé Descriptions to produce an implementation of Dynamic Career Language. Sources such as résumés, job postings, governmental data, and corporate social media are intelligently combined to compose a rich and complete definition of job titles and terms. Here a first résumé 500 shows work experience having job titles for a Manager at company A and Sales for Company B. A second résumé 502 shows work experience having job titles for an Executive at company C and Manager at Company A. Résumé s 500 and 502 will be compared with Job Posting 506 that shows Company A recruiting for a manager in department D. The terms of these titles in résumés 500 and 502 and job posting 506 are combined as concatenated descriptions in concatenated document 510. The concatenated document 510 then undergoes the methods described in FIGS. 1A-3 via semantic characterization 512 for output as concept vector representation 514.

Crowd-sourced Résumé Descriptions. An embodiment of this invention provides methods for harvesting and analyzing data for generation of other present inventions such as Career Threading and Dynamic Career Language through sourcing of text samples from the general public.

Crowd-sourced Résumé Validation Score. An embodiment of this invention provides a method for determining the accuracy of statements within a résumé or individual job description. It allows for an objective and repeatable determination of the validity of claims made by a job applicant within a résumé or claims made by a company generated job description.

FIG. 10 diagrammically depicts an example of how the résumés of two hypothetical job applicants might be compared using Crowd-sourced Résumé Validation Score. The diagram illustrates the difference between intuitive practice of using keywords to screen a résumé, and using Crowd-sourced Résumé Validation score based on semantic abstraction. Here job posting 582 is recruiting for an engineer for embedded systems development and must have experience in using circuit design and C++ software. Person-A's résumé 584 shows his title to be an engineer at the ABC Company in which the résumé 584 expressly describes Person-A to be experienced in circuit design, C++ software, and embedded systems. Person-B's résumé 586 also shows his title to be an engineer at the ABC Company but his experience does not expressly state the same terms listed in the job posting 582. Instead résumé 586 shows person-B's experience in more general phrases, such as "design of analog front end for data acquisition instrumentation" and "developed signal analysis software for XYZ microcontroller platform". At first glance it would seem that Person-A's résumé 584 to be a perfect match for job posting 582.

However, the job titles from multiple information sources, written in natural languages, upon being concatenated and then undertaken with the methods described in FIGS. 1A-3, the concepts arising from the semantic representation of text in relation to a natural language knowledgebase converts the text into a concept vector representation. This captures the definition of a job title as a list of related concepts and conceptually defines the title outside of a natural language scope. When the database includes a large number of crowd-sourced résumé descriptions to create concept vector representations, the vectorized job titles constitute a dynamic job title. The extra isolated natural language descriptions of a tile may be converted into the concept vector space in a similar way and analyzed against the dynamic version of that tile for conceptual substance and similarity. In this way, the same job tile may be described in radically different ways within the confines of natural language, but may be shown to convey essentially the same definition through conceptual semantic comparison. Similarly, work experience descriptions when vectorized into concept vector forms may dynamically mean something else. Thus general descriptions lacking expressly stated topics in natural languages may, when vectorized, show those same or more expressly stated topics. Thus in FIG. 10, though it appears counter intuitive, the vectorized version of Person-B's résumé 586 was deemed the better match.

In accordance for further embodiments of the present invention, a higher order concept vector space is presented for identifying abstract relationships between texts and concept hierarchies using the methods described in FIGS. 1A-3 in which abstract semantic analysis of natural language texts are processed in view of higher order conceptual knowledge bases. These embodiments involve relating a given concept map to another sample concept map from a concept map based corpus through the medium of an ontological concept vectorized knowledge base. Results may then pass through any number of subsequent layers of higher order concept knowledge base comparisons to achieve the preferred level of abstraction for an application. Through such an invention, second, third, fourth, and higher levels of abstract comparison may also be achieved.

The output of the SEMANTIC REPRESENTATION OF TEXT IN RELATION TO A NATURAL LANGUAGE KNOWLEDGE BASE aspect of the embodiment discussed above is called a first order concept map. For a sample text, a second order concept map may be generated by examining the concepts related to a second order concept ontology. The output from which is a second order concept map. FIG. 2 depicts an example of this process in which a first order concept map is converted to a second order concept map by comparison to a concept knowledge base.

In the context of a job candidate résumé text to job description text comparison, the utility of the current invention becomes apparent. Once first order concept relationships are identified between a résumé and job description, second order concept maps may reveal domain specific relationships while a third order concept map could be utilized to implement Dynamic Career Language.

Consider the following implementation:

Work experience sections from hundreds of thousands of résumés from many different industries are taken as semantic descriptions of a job titles at corresponding companies. These natural language text segments are converted into concept maps using methods described in Semantic Representation of Text in Relation to a Natural Language Knowledge Base (see FIG. 1). Descriptions of the same job title are concatenated to form a more descriptive model of that title. In parallel, an established collection of career field descriptions such as the Occupational Outlook Handbook is converted to a set of maps using the same methods. Next, job description maps are compared to career field maps using vector math techniques to produce a second order concept map as depicted in FIG. 2. This second order concept map allows for the classification of job descriptions by field.

Once this database is constructed, a job seeker may input their résumé into the system as a query. First, the concept map of their résumé is compared to the second order career field concept map to return a ranked list of career fields most suited to them based on the skills and experiences they describe in their résumé. Then, the concept map of the job seeker's résumé may be compared to a set of concept maps from job descriptions which were grouped in that field. In this way, the job seeker may explore the specific job titles they might qualify for within a particular career field, thus allowing them to identify potentially new alternative career paths requiring their unique combination of experiences of which they were previously unaware.

Embodiments of the current invention provide systems and methods for weighting the outputs of higher order concept comparison processes to develop an overall score of conceptual semantic relevance between two texts; for generating higher order concept ontologies automatically by analyzing patterns in lower order concept maps for a set of related texts; for defining Dynamic Career Language; for constructing an ontologized set of concept vector representations of jobs as Crowd-sourced Résumé Descriptions; and for implementing alternative career exploration elements of Career Threading.

Example of Problems solvable by embodiments of the invention are: A person has an experience of skills and abilities that are transferable to many industries yet they cannot be precisely matched to a specific job, closely related job titles, or domain areas. This means that the government Standard Occupational Classification and or other methods of having a precise definition are not suitable for the constantly changing needs of an employer.

Example of solutions provided by embodiments of the invention: An employer can have a person's skills dynamically defined based on an ever changing corpus which is used to characterize their business conceptually. Thus a person who at the first glance seems irrelevant to the employer could become relevant based on the conceptual evolution of the corpus without the need for additional supplementary information from employer that they perceived as relevant.

FIG. 10 graphically depicts an example of how the résumés of two hypothetical job applicants might be compared using a Crowd-sourced Résumé Validation Score.

Figure 11:
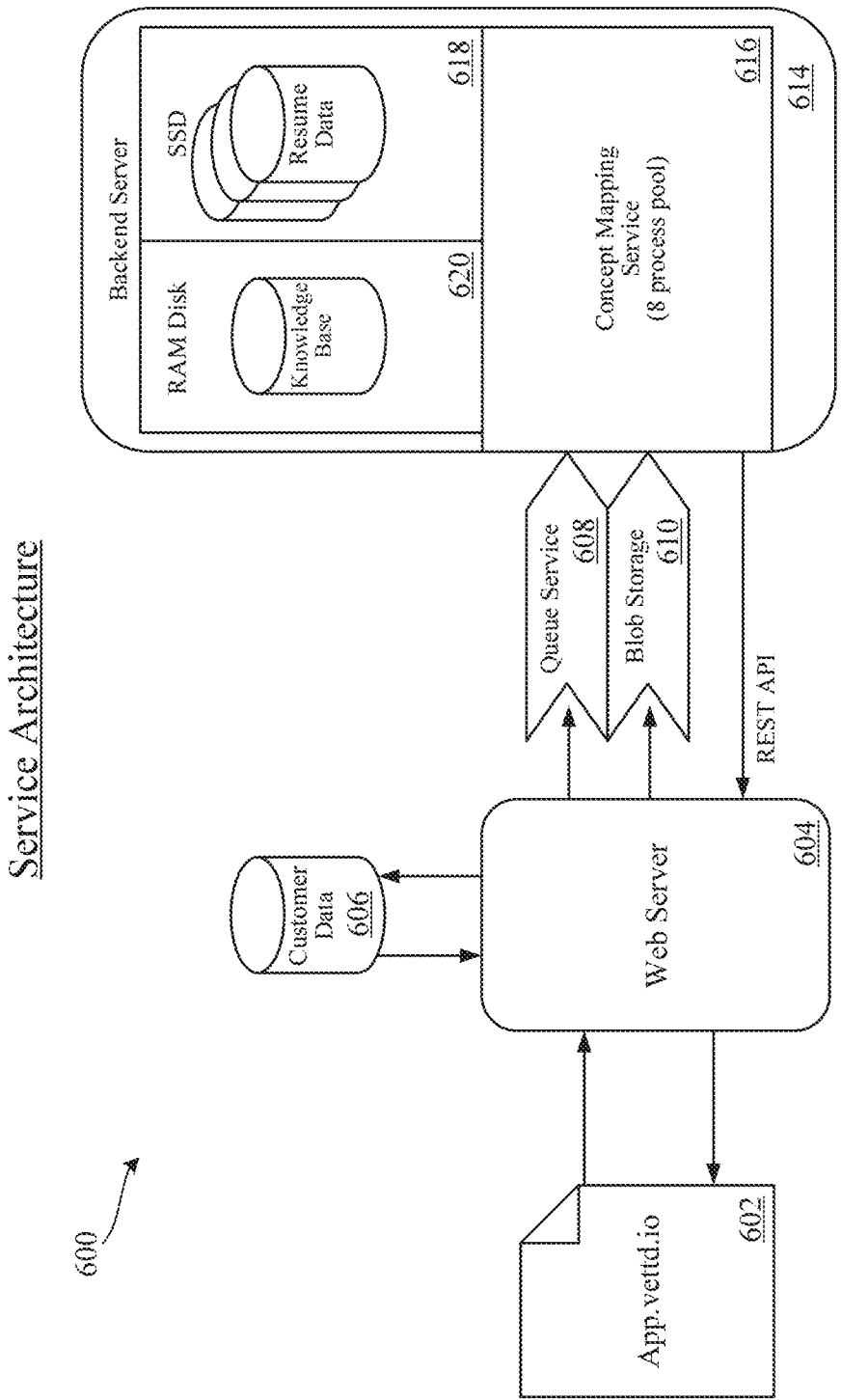
FIG. 11 depicts a hardware system diagram configured to execute the microprocessor executable methods described in FIGS. 1A-3.

FIG. 11 depicts an example of a hardware system diagram configured to execute the microprocessor executable methods described in FIGS. 1B-3. The system diagram shows Service Architecture 600 that comprises a web server 604 hosting a browser facing application described as App.vett-d.io 602. The web server 604 is in communication with a Customer Data source 606. Actions taken by the hiring manager within the application 602 precipitate processing requests which are forwarded to a backend server 614 via an Azure queue storage service 608, or similar services may also be utilized. See e.g. http://download.microsoft.com/download/D/E/E/DEE91FC0-7AA9-4F6E-9FFA-8658AA0FA080/Introduction%20to%20Windows%20Azure%20for%20Java%20Developers%20-%20Whitepaper.pdf; See also https://aws.amazon.com/rds/. Résumé files and job criteria are uploaded to the Azure blob storage 610 by the web server 614. The backend server 614 processes these requests and returns results through an application program interface denoted as RESTful API 617 hosted by the web server 604.

The web server 604 then renders these results to the hiring manager via the web browser facing application 602.

The Semantic Representation of Text in Relation to a Natural Language Knowledgebase as described for the Conceptual Relevance Generator 50 of FIG. 1B, the Second Order Concept Map Generator 100 described in FIG. 2, and the Contextually Weighted Relevance Generator 200 described in FIG. 3 are realized primarily through a service hosted on the backend server 614. Referred to as Concept Mapping Service 616 provides "Map Positions" of the vectorized portions of natural language information sources and is written in Python programming language. The Concept Mapping Service 616 preferably utilizes on two internal libraries which implement the concept vector representations through use of Xapian NoSQL database 618 and Wikipedia as a knowledgebase 620. They are "cvlib.py" for database 618 and "cvkb.py" for knowledge base 620. The Map Positions or Concept Mapping Service 616 takes requests from the frontend and makes calls to these two libraries respectively contained within the database 618 the knowledgebase 620 to perform processing services for the frontend including comparing résumé text to that of a job description. The Concept Mapping Service 616 as show within the Backend Server 614 of FIG. 11 comprises an 8-process pool.

When a hiring manager uses the methods described in FIGS. 1B-3 above, they first create a job position and upload associated job criteria. Appropriate criteria may include a job posting, résumé of an ideal candidate, or any combination of natural language samples which embody the responsibilities of the job. Next, the hiring manager uploads the résumés of individuals applying for the job. These activities are encapsulated into requests which are forwarded to the backend server via an Azure storage queue as depicted in FIG. 11. Additionally, résumé files and job criteria are uploaded to the Azure blob storage 610 by the web server 614 for download by Map Positions. At this point, the Map Positions service will call cvlib.UnifiedIndex.add_entities( ) to add the natural language text of each résumé to a new database.

It is advantageous to understand the operation of comparing résumés to a job description in this application involves instantiation of two Xapian databases. FIG. 11 shows this as "Résumé Data" and it is stored on a solid state drive, SSD as the Xapian NoSQL database 618 for efficient read and write access. In the Backend Server 614, Xapian NoSQL database 618 stores the text associated with résumés that will undergo analysis. The Wikipedia based Knowledgebase 620 stores the concept vector representation of those résumés. Here the Knowledgebase 620 is depicted for storage within a random access memory disk, or RAM disk to maximize data transfer speeds. Xapian is a NoSQL document database and may be indexed by terms within the document undergoing analysis. In the case of a text document, these terms are individual words within the document and the indexing process sorts documents by the frequency of the occurrence of these terms within the document. In the concept vector representation, the terms are concepts with which the document is found to be strongly correlated and indexing occurs by sorting the documents by the strength of their relation to these concepts. A third database also exists which contains indexed text forming the knowledgebase. FIG. 11 shows this database existing in a RAM disk to maximize read speeds. After analysis and completion of vectorizing processes, the résumé data is transferred permanently to hard disk SSD 618 and loaded into RAM disk 620 upon microprocessor-based system boot-up or start.

Though any collection of natural language texts which describe certain facts relative to the domain of analysis may constitute a knowledge base, the particular embodiments use data from Wikipedia for this purpose. Wikipedia, in the context of a knowledgebase, may be seen as a collection of natural language texts which each describe a certain idea. In this instance, each article is taken as a concept and the text within the article defines the concept. Wikipedia can also be seen as a brief summary of all human knowledge and is constantly evolving to capture the most current widely accepted understanding of a great number of domains. An open-ended knowledgebase such as Wikipedia allows the particular embodiment's system to conceptualize many nuanced facets of a wide range of career fields which may be overlooked with a manually curated knowledgebase. Other knowledge bases may be employed for applications involving Abstract Semantic Analysis of Natural Language Text Using the Notion of Higher Order Conceptual Knowledgebases generally for ontologizing the base concept space. It is advantageous to note that any consistent collection of natural language text samples may be used depending on the type of analysis being performed. cvlib.py consists of three classes. They are as follows:

BasicDBIndex—An abstraction to the xapian python module which provides convenient methods for parsing and executing queries on a xapian database.

ConceptVectorindex—Inherits from BasicDBIndex and provides methods for manipulating datasets in concept vector representation form.

UnifiedIndex—Inherits from BasicDBIndex and is the primary API used directly by the Map Positions service. It allows for simultaneous synchronized search and manipulation of both the text and concept vector databases allowing them to be treated as one unit.

cvkb.py consists of one class:

KnowledgeBase—Inherits from cvlib.BasicDBIndex and is responsible for conversion of natural language text into a concept vector representation based on a given knowledgebase.

Consider this scenario. A hiring manager at a medium sized software company needs to hire a new Sales Executive. This hiring manager is an experienced sales person but new to hiring and managing a team. Assume this particular company has limited recruiting resources. Screen shots and process descriptions that follow depict the "app.vettd.io" application hosted from a web server as depicted in FIG. 11.

1. Create a job description. The first step the hiring manager will need to take is to create a job description. This job description describes the duties and expectations of a prospective employee and may also describe the sort of work the hiring company does. Additionally, this description will serve as the basis by which the application judges the qualification of candidates.

Detailed descriptions employed by the algorithms of embodiments of the invention provide for detailed qualifications. The more nuanced the job description, the more nuanced the determination of qualifications. Thus the preferred and alternate embodiments include a tool to aid in the creation of effective job descriptions. By giving real-time feedback as the job description is being created, assurance that the criteria utilized to score candidates is sufficient to achieve the matching requirements. Embodiments provide various types of feedback having value that comes from analyzing the pragmatic, impartiality, modality, and mood of the sentence. Sentiment analysis of this variety is used to identify sentences which may contain statements of fact or requirements. Additionally, Semantic Representation of Text in Relation to a Natural Language Knowledgebase and Dynamic Career Language are employed to determine how the relevancy of statements within the job description are to the job at hand. This allows the hiring manager with no prior experience writing job descriptions to create a focused, substantive job description.

2. Post the job and add résumés. After the hiring manager has a job description, he/she can then use their company's existing job board tools (i.e. Indeed, Monster, CareerBuilder) to collect candidate résumés. At this point, a hiring manager may have hundreds of candidates to review. Future iterations of this application may include job board features and functionality however; this function is not driven by the particular embodiment's core technology or central to the experience.

Manually, or through API integration with job boards, the hiring manager pulls candidate résumés into the methods described in the particular embodiments of the invention. The hiring manager can simply drag and drop résumés into the methods of the particular embodiments as illustrated in the screen-shot depictions of FIGS. 12-18 described below. Once the particular embodiments of the methods and system have both the job description from Step 1 and the résumés from Step 2, it begins the semantic analysis using Semantic Representation of Text in Relation to a Natural Language Knowledgebase using the algorithms described in FIGS. 1A-3 above.

When a hiring manager uses the application, they first create a job position and upload associated job criteria. Appropriate criteria may include a job posting, résumé of an ideal candidate, or any combination of natural language samples which embody the responsibilities of the job. Next, the hiring manager uploads the résumés of individuals applying for the job. These activities are encapsulated into requests which are forwarded to the backend server via an Azure storage queue as depicted in FIG. 11. Additionally, résumé files and job criteria are uploaded to the Azure blob storage 610 by the web server 614 for download by Map Positions. At this point, the Map Positions service will call cvlib.UnifiedIndex.add_entities( ) to add the natural language text of each résumé to a new database. The add_entities command will subsequently make calls to the underlying BasicDBIndex and a ConceptVectorindex instance to store the text of the document and convert and store the text as a concept vector representation.

\# Shown below, cvlib.py algorithms for extraction of data and storage of vector representations:

```
'''
cvlib.py
Python 2.7

Provides class abstractions to the xapian package.

'''

# Python builtin packages
import os
import sys
import string
import re
import codecs
import time
import datetime
```

```
import math
import threading
import traceback

# Internal packages
from log import log

# Third party packages
import xapian as xap try:
        from nltk import corpus except ImportError:
        print >> sys.stderr, "Error (xapiCVR 003): Exception (ImportError) nltk.cor\
pus.stopwords"
        sys.exit(1)

Global declarations

WORD_RE = re.compile(r"\\w{1,32}", re.U)
ARTICLE_ID = 0
MAXSTRLEN = 256
MINSTRLEN = 2
DEFAULT_XAPIAN_FLAGS = (
        xap.QueryParser.FLAG_PHRASE |
        xap.QueryParser.FLAG_LOVEHATE)
DEFAULT_STEMMING_STRATEGY = xap.QueryParser.STEM_SOME
DEFAULT_CVR_FLAG = xap.Query.OP_OR

Class definitions class BasicDBIndex:
        '''
        Abstract class for manipulating and querying a Xapian database.
        ''' def __init__(self, **kwargs):
                '''
                Initialize BasicDBIndex.
                ''' dbPath = kwargs['dbPath']
                lang = 'english'
```

```
if 'lang' in kwargs:
    lang = kwargs['lang']

mins = MINSTRLEN if 'mins' in kwargs:
    mins = kwargs['mins']

maxs = MAXSTRLEN if 'maxs' in kwargs:
    maxs = kwargs['maxs']

stemmingStrategy = DEFAULT_STEMMING_STRATEGY if 'stemmingStrategy' in kwargs:
    stemmingStrategy = kwargs['stemmingStrategy']

if not os.path.exists(dbPath):
    os.makedirs(dbPath)
    print "WARNING (xapiCVR 001): DB Path does not exits"

try:
    self.db_path = dbPath
    self.reindex = 0
    self.transaction_active = False
    self.language = lang
    self.stopwords = set(corpus.stopwords.words(lang))
    self.stemming_strategy = stemmingStrategy
    self.minlength = mins
    self.maxlength = maxs
    self.db_lock = threading.RLock()

except Exception, e:
    print >> sys.stderr, "Error (xapiCVR 002): Exception (%s)" % str(e)

sys.exit(1)

def is_stopword(self, word):
    '''
    Returns True if word is in the stopwords list
    ''' return word in self.stopwords
```

```
def get_indexer(self, database = None):
    '''
    Return an indexer for the given database which will convert a document
    into a collection of terms.
    '''

# If database is not given, create one
    if not database:
        database = self._get_database(writable = True)

# Create new TermGenerator
    indexer = xap.TermGenerator()

# Point term generator at the current database
    indexer.set_database(database)

# Set the stemmer the term generator will use to consolidate terms
    indexer.set_stemmer(xap.Stem(self.language))

return indexer def new_document(self):
    '''
    Return a Xapian Document object instance.
    ''' return xap.Document()

def _get_database(self, **kwargs):
    '''
    Return the underlying database object for the initialized path.
    '''

# Check for writable flag
    writable = False
    if 'writable' in kwargs:
        if kwargs['writable']:
            writable = True else:
            writable = False database = None

Return a different interface for reading and writing operations
```

```
if writable:
    try:
        database = xap.WritableDatabase(
            self.db_path,
            xap.DB_CREATE_OR_OPEN)

except Exception, e:
        print >> sys.stderr,
            "Error (xapiCVR in _get_database): (%s)" % str(e)
        return None else:
    try:
        database = xap.Database(self.db_path)

except Exception, e:
        print >> sys.stderr,
            "Error (xapiCVR in _get_database): (%s)" % str(e)
        return None return database def _get_enquire_mset(self, database, enquire, start, count):
    '''
    Run an enquire operation and generate a match set.

database - The database to be read
    enquire - An instance of an Xap.enquire object
    start - The start offset to pass to `enquire.get_mset`
    count - The end offset to pass to `enquire.get_mset`

Return a match set of search results
    ''' try:
        return enquire.get_mset(start, count)

except xap.DatabaseModifiedError:
        try:
            database.reopen()
            return enquire.get_mset(start, count, checkatleast=count)

except IOError:
```

```
                    print >> sys.stderr, "Error (xapiCVR 006): Unable to open datab\
ase at %s (_get_enquire_mset)" % self.db_path
                    sys.exit(1)

def remove_stopwords(self, queryString):
        '''
        Removes stopwords from a query.

queryString - The input query to be cleaned of stopwords

Returns the queryString free of stopwords.
        '''

# Create a list of individual terms
        word_list = string.split(queryString)

# From the list, build a new string of only words that are not stopwords
        new_string= ""
        for word in word_list:
            if not self.is_stopword(word):
                new_string = new_string + word + " "

return new_string def parse(self, queryString, flags=xap.Query.OP_AND, removeStopWords=True):
        '''
        Build a Xapian query.

queryString - Input query text.
        flags - Flags to set the way terms will be combined when Xapian builds
            the query.
        removeStopWords - Boolean, when True, remove stop words from input text
            before generating the query.

Returns a Xapian query object.
        '''

# Handle special queries
        if queryString == '*':
            # Match everything
            return xap.Query('')
```

```
elif queryString == '':
        # Match nothing
        return xap.Query()

if removeStopWords:
        # Remove stopwords from query
        queryString = self.remove_stopwords(queryString)

# Instantiate and configure a Xapian query parser
qp = xap.QueryParser()
qp.set_database(self._get_database())
qp.set_stemmer(xap.Stem(self.language))
qp.set_stemming_strategy(xap.QueryParser.STEM_SOME)
qp.set_default_op(flags)
qp.add_boolean_prefix ("uid", "I");
qp.add_boolean_prefix ("title", "S");
qp.add_boolean_prefix ("author", "A");
qp.add_boolean_prefix ("url", "U");
qp.add_boolean_prefix ("tag", "XT")

# Create query object
query = qp.parse_query(queryString, DEFAULT_XAPIAN_FLAGS)

return query def parse2(self, queryString, flags=xap.Query.OP_AND, removeStopWords=True):
        '''
        Convert an input text into Xapian query object.

queryString - Input query text.
        flags - Flags to set the way terms will be combined when Xapian builds
                the query.
        removeStopWords - Boolean, when True, remove stop words from input text
                before generating the query.

Returns a Xapian query object.
        '''

# Handle special queries
        if queryString == '*':
                # Match everything
                return xap.Query('')
```

```
    elif queryString == '':
        # Match nothing
        return xap.Query()

if removeStopWords:
        # Remove stopwords from query
        queryString = self.remove_stopwords(queryString)

# Create list of terms from query
    word_list = string.split(queryString)

# Force all terms to lowercase
    terms = []
    for word in word_list:
        terms.append(word.lower())

# Build a xapian query object
    query= xap.Query(flags, terms)

return query def search(self, query, start=0, count=150, sort_by = ""):
    '''
    Search the database using the give query.  Wraps _search and handles the
    database write lock.

query - String representing a query
    start - Index at which to start returning results
    count - Number of results to return
    sort_by - Fields to sort results by Returns a match set of the query results.
    ''' with self.db_lock:
        return self._search(query, start, count, sort_by)

def _search(self, query, start, count, sort_by):
    '''
    Search the database using the give query.

query - String representing a query
    start - Index at which to start returning results
    count - Number of results to return
``` sort_by - Fields to sort results by

Returns a match set of the query results.
'''

Open the database for writing
database = self._get_database(writable = False)

Instantiate an enquire object
enquire = xap.Enquire(database)

Set the query to the current query
enquire.set_query(query)

if not count:
    count = database.get_doccount() - start

Instantiate a sorter to sort search results
sorter = xap.MultiValueSorter()

Configure sorter
sort = 'RELEVANCE_THEN_VALUES'
nkeys = 0
for key in sort_by.split(','):
    if key=='':
        continue elif key=='R':
        if nkeys==0:
            sort = 'RELEVANCE_THEN_VALUES' else:
            sort = 'VALUES_THEN_RELEVANCE' else:
        if sort=='VALUES_THEN_RELEVANCE':
            print >> sys.stderr,
                "Relevance can only be the first or last sort key."

sys.exit(1)

forward = True if key[0]=='-':
            forward = False

```
                    key = key[1:]

sorter.add(int(key), forward)
                nkeys += 1

# Set sorting method of the enquire
        if nkeys==0:
            enquire.set_sort_by_relevance()

elif sort=='VALUES':
            enquire.set_sort_by_key(sorter)

elif sort=='VALUES_THEN_RELEVANCE':
            enquire.set_sort_by_key_then_relevance(sorter)

elif sort=='RELEVANCE_THEN_VALUES':
            enquire.set_sort_by_relevance_then_key(sorter)

# Query the database and get the match set
        matches = self._get_enquire_mset(database, enquire, start, count)
        database = None
        return matches class ConceptVectorIndex(BasicDBIndex):
    '''
    Wrapper around BasicDBIndex for manipulating concept vector representations.
    '''

ITEMID = 0
    CVRSOURCE = 1
    DIM   = 2
    OFFSET = 3 def __init__(self, **kwargs):
        if not 'dbPath' in kwargs:
            kwargs['dbPath'] = os.path.join(os.path.dirname(__file__),
                    './knowledgebase')

BasicDBIndex.__init__(self, **kwargs)

def generate_cvr(self, itemid, li, knowledgebase=None, dim=250,
            saveText=True,                      flags=DEFAULT_CVR_FLAG,
 removeStopWords=True):
        '''
```

```
        Given an Item, associated list of texts, and a knowledgebase, will
        produce the concept vector representation of the texts.

itemid - A string that will be used by caller to identify the enitity
                item
        li    - List of tuples of text and weight pairs
        knowledgebase - The knowledgebase that will be used for characterization
        dim   - Dimension of the concept vector Returns a document object containing the concept vector representation.
        ''' from cvkb import KnowledgeBase

If an alternative knowledgebase is not given, set a default
        if knowledgebase == None:
                knowledgebase = KnowledgeBase()

# Validate knowledgebase object
        elif not isinstance(knowledgebase, KnowledgeBase):
                print >> sys.stderr, "Error (xapiCVR 012): Type error for CVR oracl\
e (%s)" % str(knowledgebase)
                return None

# Instantiate a document object
        Entity = xap.Document()

# Set some context values for this document
        Entity.add_value(ConceptVectorIndex.ITEMID, str(itemid))
        Entity.add_value(ConceptVectorIndex.CVRSOURCE,
                str(knowledgebase.db_path))

# Generate the concept vector
        Vec = knowledgebase.concept_vector(li, end_offset=dim, flags=flags,
                removeStopWords=removeStopWords, getTitle=True)

if len(Vec) == 0:
                return None

# Record the length of the vector
        Entity.add_value(ConceptVectorIndex.DIM, str(len(Vec)))

for i in Vec:
                # Record all components of the vector
```

```
            Entity.add_posting(str(Vec[i][1]), i)
            Entity.add_value(ConceptVectorIndex.OFFSET+i, str(Vec[i][2]))

if saveText:
            # Concatenate text samples and record
            text = ""
            for i in list:
                text += i[0]

Entity.set_data(text)

return Entity def fetch_cvr(self, ent = None, normalized = False):
        '''
        Builds a simplified vector from the concept vector representation.

ent - Document object instance containing a concept vector
            representation.
        normalized - Boolean flag indicating whether to normalize the vector
            using root mean squared.

Returns a optionally normalized vector.
        '''

# Validate ent is a document object
        if not isinstance(ent, xap.Document):
            db = self._get_database()

try:
                entity = db.get_document(ent)

except Exception, e:
                print >> sys.stderr, "Error (xapiCVR 014): Unable to form CVR v\ector (%s)" % str(e)
                return None else:
            entity = ent Vec = {}
        termlist = entity.termlist()
        dim = int(entity.get_value(ConceptVectorIndex.DIM))
```

```
vlen = 0 for i in range(dim):
        Vec[i]={} if normalized:
                # Calculate normalization factor.
                tempf  =  float(entity.get_value(ConceptVectorIndex.OFFSET+i))
                vlen += tempf*tempf if normalized:
        # Normalize by root mean squared.
        vlen = math.sqrt(vlen)

termpos = 0
for term in termlist:
        # Build a temporary vector from the termlist of a concept vector
        # representation.
        Vec[termpos][0] = term.term
        Vec[termpos][1]  =  float(entity.get_value(ConceptVectorIndex.OFFSET +
                termpos))

if normalized:
                # Apply normalization factor.
                Vec[termpos][1] /= vlen termpos += 1 return Vec def inner_product(self, tv1, tv2):
        '''
        Calculate the inner product of two vectors.

tv1 - Dictionary of tuples containing a concept vector representation.
        tv2 - Dictionary of tuples containing a concept vector representation.

Returns a numeric inner product of the two input vectors.
        ''' innp = 0
        len1 =0
        vec1 = {}
```

```
for i in tv1:
        # Build a simplified vector representation of tv1
        vec1[tv1[i][0]] = tv1[i][1]
        len1 += 1 len2 = 0
vec2 = {} for i in tv2:
        # Build a simplified vector representation of tv2
        vec2[tv2[i][0]] = tv2[i][1]
        len2 += 1 for con in vec1:
        # For each concept in the first vector...
        if con in vec2:
                # If it also exists in the second vector...

# Sum the products of the matching vector components
                innp += vec1[con]*vec2[con]

return innp def commit_cvr(self, entity, docid=None):
        '''
        This method saves/replaces an item in CVR database.

entity - A document object to be stored
        docid - ID of document if updating an existing document Returns a docid for the saved entity or None if failed.
        '''

# Get length of the concept vector
        dim = int(entity.get_value(ConceptVectorIndex.DIM))

# If there are no updates, do nothing
        if dim > 0:
                # Open target database for write
                db = self._get_database(writable = True)

if not docid:
                        # If document does not exist, add it
                        docid = db.add_document(entity)
```

```
            else:
                # If document does exist, replace it
                try:
                    db.replace_document(docid, entity)

except Exception, e:
                    print >> sys.stderr, "Error (xapiCVR 013): Unable
to replac\
e the entity (%s)" % str(e)

# Return None to indicate failed operation
                    docid = None return docid def    cvr_search(self,    li,    knowledgebase=None,    dim=250,
flags=DEFAULT_CVR_FLAG,
            removeStopWords=True, start=0, count=10):
        '''
        Performs a search on a dataset of concept vector representations.

li - A dictionary of tuples containing text sample and weight pairs.
            ie. the query.
        knowledgebase - Optionally specify an alternative knowledge base.
        dim - Dimensionallity of the concept vector.
        flags - Bit mask which tells Xapian how to build queries.
        removeStopWords - Flag specifying removal of stopwords from a query.
        start - Index at which to start returning results.
        count - Number of results to return.

Returns a match set of documents corresponding to concept vector
        representations.
        ''' from cvkb import KnowledgeBase if knowledgebase == None:
            knowledgebase = KnowledgeBase()

elif not isinstance(knowledgebase, KnowledgeBase):
            print >> sys.stderr, "Error (xapiCVR 012): Type error for CVR
knowl\
edgebase (%s)" % str(knowledgebase)
            return None
```

```
        # Form the concept vector representation of the query
        query_cvr = knowledgebase.concept_vector(li, end_offset=dim,
                flags=flags,           removeStopWords=removeStopWords,
getTitle=False,
                normalized=True)

if len(query_cvr) == 0:
                # No components in the vector to match, return None
                return None else:
                # Form the query vector from concept vector
                query = xap.Query()

for i in query_cvr:
                        # Integrate concepts and associated weights as terms of a single
                        # query.
                        concept = query_cvr[i][1]
                        weight  = float(query_cvr[i][2])
                        query = xap.Query(flags, query, xap.Query(
                                xap.Query.OP_SCALE_WEIGHT,
xap.Query(concept), weight))

# Search the database using the generated query
                mset = self.search(query, start, count)
                return mset def get_item_id(self, itemid):
        '''
        Retrieve the concept vector representation of a document by itemid.

Returns a document object
        ''' return self._get_database().get_document(itemid)

class UnifiedIndex(BasicDBIndex):
    '''
    Wrapper around BasicDBIndex for building and searching combination document/
    concept vector representation databases.
    '''
```

```
UID    = 0
TITLE  = 1
AUTHOR = 2
URL    = 3
TAG = 4 cvr = None def __init__(self, **kwargs):
        basepath = kwargs['dbPath']
        kwargs['dbPath'] = basepath + '/text'
        self.cvr = ConceptVectorIndex(dbPath = basepath + '/cvr')
        BasicDBIndex.__init__(self, **kwargs)

def add_entities(self, items, dim = 1000):
        '''
        Synchronously add documents to the database.

items - A list of dictionaries designating fields and values for
                database documents.
        dim   - Number of components in the concept vector representation.

Returns a dictionary indicating success or failure of the operation and
        any associated exceptions.
        '''

# Get database interface as writable (Will be created if doesn't exist)
        database = self._get_database(writable = True)

mins = self.minlength
        maxs = self.maxlength
        success = {}
        i = 1 for item in items:
                uid = None try:
                        # Instantiate a document object
                        doc = self.new_document()

# Instantiate a new indexer to convert text to terms
                        indexer = self.get_indexer(database)

# Point indexer at current document
```

```
indexer.set_document(doc)
cvrText = []
uid_term = "I1"

# Build document entry for current item
for k in item:
    v = item[k]

Terms will be added to the document if k == "uid":
        # Unique ID for this document
        uid = v
        doc.add_value(UnifiedIndex.UID, v)
        uid_term = "I" + v
        doc.add_term(uid_term)

elif k == "title":
        # Optional title for this document
        doc.add_value(UnifiedIndex.TITLE, v)
        doc.add_term("S" + v)
        doc.add_term(v)

elif k == "tag":
        # Tags for categorizing and later filtering
        doc.add_value(UnifiedIndex.TAG, v)
        tags = v.split(';')

for t in tags:
            doc.add_boolean_term("XT" + t)

elif k == "author":
        # Optional author of the document
        doc.add_value(UnifiedIndex.AUTHOR, v)
        doc.add_term("A" + v)
        doc.add_term(v)

elif k == "url":
        # Optional URL source of the document
        doc.add_value(UnifiedIndex.URL, v)
        doc.add_term("U" + v)
        doc.add_term(v)

elif k == "text":
        # Text body of the document
```

```
                doc.set_data(v)
                indexer.index_text(v)

elif k == "segments":
                cvrText = v

# Insert the document into the database
        docid = database.replace_document(uid_term, doc)

# Generate concept vector representation of the document
        entity = self.cvr.generate_cvr(docid, cvrText, dim=dim)

if not entity:
            success[uid] = {'success' : False, 'error' : None}
            log("Failed to add {}/{}: {}".format(i, len(items),
                    item["title"]))

else:
            # Save the concept vector representation
            self.cvr.commit_cvr(entity, docid)
            success[uid] = {'success' : True, 'error' : None}
            log("Added    {}/{}:    {}".format(i, len(items), item["title"]))

i += 1 except Exception, e:
        if uid:
            success[uid] = {'success' : False, 'error' : e}
            log("Failed to add {}".format(item["title"]))

return success def _transform_mset(self, mset, xquery=None, cvr_flag=False):
    '''
    Transform a match set object into a list of tuples which can be more
    easily manipulated.

mset - A matchset object.
    xquery - Query object used to generate text highlights.
    cvr_flag - Flag indicating the match set contains concept vector
        representations.

Returns a list of tuples representing search results.
    '''
```

```
# Get number of results in the match set
num_results = mset.get_matches_estimated()
matches = []

for m in mset:
        if cvr_flag:
                # The documents are in concept vector representation format
                did = m.document.get_value(ConceptVectorIndex.ITEMID)
                doc = self._get_database().get_document(int(did))

else:
                doc = m.document

# Build a dictionary of the properties of this document
        match = {} match['uid'] = doc.get_value(UnifiedIndex.UID)

title = doc.get_value(UnifiedIndex.TITLE)
        if title:
                match['title'] = title author = doc.get_value (UnifiedIndex.AUTHOR)
        if author:
                match['author'] = author url = doc.get_value (UnifiedIndex.URL)
        if url:
                match['url'] = url tag = doc.get_value (UnifiedIndex.TAG)
        if tag:
                match['tag'] = tag match['relevance'] = m.weight if xquery:
                # ### Highlighting feature temporarily disabled ###
                match['highlight'] = ""

match['text'] = doc.get_data()
```

```
            matches.append(match)

return [matches, num_results]

def rank_by_text(self, query, filter=None, start=0, count=1000):
    '''
    Performs a purely text based search of the database.

query - A dictionary of tuples containing text sample and weight pairs.
    filter - Fields with which to filter results.
    start - Index at which to start returning results.
    count - Number of results to return.

Returns a set of tuples representing the results of the query.
    '''

# Concatenate all text segements
    query_string = ' '.join([i[0] for i in query])

try:
            # Create a Xapian query from the input text
            xquery = self.parse(query_string)

if filter:
                    # Inegrate search filters into the query
                    xquery = xap.Query(xap.Query.OP_FILTER, xquery,
                            self.parse(filter))

# Search the database using the generated query
            mset = self.search(xquery, start=start, count=count)

if mset:
                    # Convert the documents in the matchset into python dictionaries
                    return self._transform_mset(mset, None, False)

else:
                    return [[], 0]

except xap.DatabaseOpeningError:
            return [[], 0]

def rank_by_cvr(self, query, filter=None, start=0, count=1000):
    '''
```

Performs a purely concept based search.

query - A dictionary of tuples containing text sample and weight pairs.
filter - Fields with which to filter results.
start - Index at which to start returning results.
count - Number of results to return.

Returns a set of tuples representing the results of the query.
''' try:
    # Search the database by concept map of the query
    mset = self.cvr.cvr_search(query, start=start, count=count)

if mset:
        # Convert the documents in the matchset into python dictionaries
        return self._transform_mset(mset, None, True)

else:
        return [[], 0]

except xap.DatabaseOpeningError:
    return [[], 0]

def _combine_rank(self, li, text_matches, conc_matches, start, count,
    concept_weight=0.5, absolute_rank=False, knowledgebase=None, dim=1000,
    flags=DEFAULT_CVR_FLAG, removeStopWords=True):
'''
Take two sets of matches from text search and concept search methods and combine them into a single list of results using a given weighting scheme.

li - A dictionary of tuples containing text sample and weight pairs.
    ie. the query.
text_matches - Set of results from a text search.
conc_matches - Set of results from a concept search.
start - Starting index for returning results.
count - Number of results to return.
concept_weight - How strongly to weight concept search results when
    combining with text search results.
absolute_rank - Flag indicating to calculate an absolute correlation
    score between the query and a give matched document.

knowledgebase - Optionally specify an alternative knowledge base.
dim - Dimensionallity of the concept vector.
flags - Bit mask which tells Xapian how to build queries.
removeStopWords - Flag specifying removal of stopwords from a query.

Returns a list of top matches from both input match sets of the specified length.
''' text_weight = 1 - concept_weight
end = start + count if not text_matches:
    # There are no text search matches to zip
    matches = conc_matches elif not conc_matches:
    # There are no concept search matches to zip
    matches = text_matches else:
    # Combine text and concept matches in to one set of results
    normpos = 5
    text_max = text_matches[min(normpos, len(text_matches) - 1)]
        ['relevance']

for m in text_matches:
        # Adjust relevance scores by normalized weight
        m['relevance'] *= (text_weight / text_max)

conc_max = conc_matches[min(normpos, len(conc_matches) - 1)]
        ['relevance']

for m in conc_matches:
        # Adjust relevance scores by normalized weight
        m['relevance'] *= (concept_weight / conc_max)

matches = []
    text_matches.reverse()
    conc_matches.reverse()
    m_text = text_matches.pop()
    m_conc = conc_matches.pop()
    done = False while (len(matches) < end) and (not done):

see if matches)

and the the matches. Get

Check if matches)

matches and text

```
                # Build a set of matches of the required length
                if m_text['relevance'] > m_conc['relevance']:
                    # If relevance of top text match is highest, check to this document is already in the result set.
                    dups = filter(lambda m: m['uid'] == m_text['uid'], if not dups:
                        # If not, append it to the result set.
                        matches.append(m_text)

if not text_matches:
                        # We've reached the end of the text matches result set is not full.  Append the rest of concept matches to fill out the result set.
                        matches.extend(conc_matches)
                        done = True else:
                        # We've not reached the end of the text the next text match.
                        m_text = text_matches.pop()

else:
                    # The top concept match has the highest relevancy.

# the document is already in the result set.
                    dups = filter (lambda m: m['uid'] == m_conc['uid'], if not dups:
                        # If it isn't, append it to the result set.
                        matches.append (m_conc)

if not conc_matches:
                        # If we've reached the end of the concpet result set is not full, append the rest of the matches to fill out the result set.
                        matches.extend (text_matches)
```

```
                    done = True;

else:
                    # We've not reached the end of the concept
matches.  Get
                    # the next concept match.
                    m_conc = conc_matches.pop()

if absolute_rank:
        # Convert relevancy into an absolute scale for the query.
        from cvkb import KnowledgeBase if knowledgebase == None:
                # Instantiate a knowledge base knowledgebase object
                knowledgebase = KnowledgeBase()

elif not isinstance(knowledgebase, KnowledgeBase):
                print >> sys.stderr, "Error (xapiCVR 012): Type error for
CVR knowledgebase (%s)" % str(knowledgebase)
                return None

# Generate a concept vector representation of the initial query
        query_cvr = knowledgebase.concept_vector(li, end_offset=dim,
                flags=flags,          removeStopWords=removeStopWords,
getTitle=False,
                normalized=True)
        qVec= {} for i in range(len(query_cvr)):
                # Copy values from the concept vector representation into a
new
                # vector.
                qVec[i] = {}
                qVec[i][0] = query_cvr[i][1]
                qVec[i][1] = float(query_cvr[i][2])

for i in range(len(matches)):

itm = matches[i]

# Retrieve the document corresponding to this match from
its uid
                doc = self.get_doc_by_uid(itm['uid'])
                itemid = doc.get_docid()
```

```
                        # Retrieve the corresponding document storing the concept
vector
                        # representation.
                        cvrdoc = self.cvr.get_item_id(itemid)

# Extract a normalized vector from the concpet vector
                        # representation.
                        cvr = self.cvr.fetch_cvr(cvrdoc, normalized=True)

# Call the absolute relevance score the inner product of the
                        # concept vector representation of the query document and
the
                        # concept vector representation of the matched document.
                        matches[i]['absolute'] = self.cvr.inner_product(cvr, qVec)

return matches def rank(self, query, filter=None, start=0, count=1000, concept_weight=0.5,
                 absolute_rank = False):
            '''
            Query the database and retrieve list of all documents sorted by their
            relevancy to the query. Performs both text based and concept vector
            based search and combines the results of each to produce an overall
            score for each result.

query - A dictionary of tuples containing text sample and weight pairs.
                    ie. the query.
            filter - Fields by which to filter results.
            start - Starting index for returning results.
            count - Number of results to return.
            concept_weight - How strongly to weight concept search results when
                             combining with text search results.
            absolute_rank - Flag indicating to calculate an absolute correlation
                            score between the query and a give matched document.

Returns a list of tuples of search results.
            ''' try:
                text_matches = {}
                text_count = 0
                conc_matches = {}
                conc_count = 0
                end = start + count
```

```
                    if concept_weight == 0.0:
                            # If concept search weight is 0.0 then only do text search
                            [text_matches, text_count] = self.rank_by_text(query,
filter,
                                    start, count)

elif concept_weight == 1.0:
                            # If concept search weight is 1.0 then only do concept
search
                            [conc_matches, conc_count] = self.rank_by_cvr(query,
filter,
                                    start, count)

else:
                            # Else, perform both searches
                            [text_matches, text_count] = self.rank_by_text(query,
filter, 0,
                                    end)
                            [conc_matches, conc_count] = self.rank_by_cvr(query,
filter,
                                    0, end)

# Combine results of both searches
                            matches = self._combine_rank(query, text_matches,
conc_matches,
                                    start, count, concept_weight, absolute_rank)

return [matches[start:end], len(matches)]

except xap.DatabaseOpeningError:
                    return [[], 0]

def get_doc_by_uid(self, uid):
            '''
            Return the document object from the database with the corresponding uid
            field. If it doesn't exist, return None.
            ''' uidset = self.search(xap.Query('I'+uid), start=0, count=1)

if uidset:
                    return uidset[0].document
            else:
                    return None
```

Figure 12:
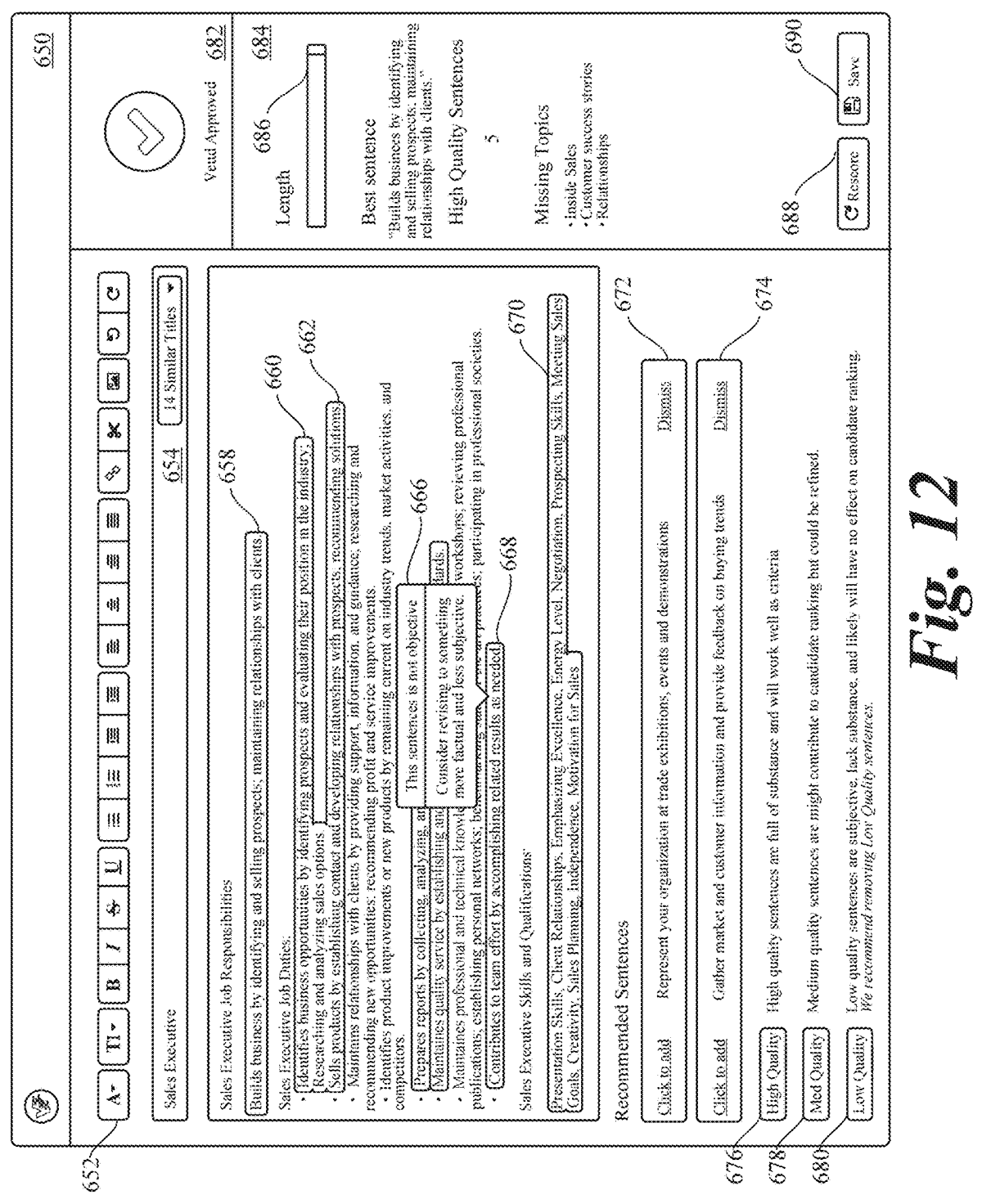

FIG. 12 depicts a webpage 650 offering instructions to guide a hiring manager while writing a job description using an overlaid heat map utilizing the methods described in FIGS. 1A-3. The webpage 650 includes a plurality of editing buttons 652, a job title bar 654, a job responsibilities section 656, a recommended sentences section 658, a sentence quality indicator section 670, a decision section 682, and a summary section 686.

In general the webpage 650 provides for a machine and a microprocessor executable method to guide a user to modify an information source expressed in terms of a natural language. The webpage 650 employs the methods described in FIGS. 1B-3 above in which the natural language of a first information source is converted to a first concept vector and a plurality of second concept vectors, either obtained from the Concept Corpus 62 described in FIG. 1B, or the Secord Order Concept Map 108 from the Concept Base 104 described in FIG. 2, or the Concept Corpus 224 or Contextually Weighted Relevance value 234 described in FIG. 3. In the particular embodiment, the Concept Corpus 62, the Second Order Concept Map 108, the Concept Base 104, the Concept Corpus 224, or the Contextually Weighted Relevance value 234 are retrievable from the Knowledge Base 620 or the Database 618 of the Backend Server 614 of the Service Architecture system 600 described in FIG. 11.

The job responsibilities section 656 includes a list of responsibilities, duties, skills, and qualifications 658. The Recommended Sentences section 660 includes sentence examples 662 and 664 that are in view of the user while writing the job description document. While drafting, a dialog box 666 appears to the user with a statement if the sentence being drafted is objected and suggestion for revision. Also, while drafting indicator buttons 676, 678, and 680 within sentence quality indicator section 670 are highlighted whether a sentence being drafted by the user is deemed to be, respectively, is High Quality 676, Medium or Med Quality 678, or Low Quality 680. The indicator button 676, 678, and 680 within the job responsibilities section 656 will change their appearance in any number of ways, such as lighting up, color change, or change in font appearance whenever a sentence is being drafted or whenever a previously written sentence upon being touched with a digital pointer is selected.

Figure 13:
FIG. 13 depicts a webpage dashboard for loading files of information sources to analysis by the methods described in FIGS. 1A-3.

FIG. 13 depicts a webpage file-loader dashboard 700 to upload files information source files for analysis by the methods described in FIGS. 1A-3. The file-loader dashboard 700 and upload candidate résumés section 704, and a drag-and-drop section 712. The Upload candidate résumés section 704 includes a job position indicator 706, a criteria indicator 708, and a candidates indicator 710. The indicators 706, 708, and 710 change appearances depending on the type of file uploaded, respectively, for example, either a job position file, a job criteria file, or a candidate résumé file. In the drag-and-drop section 712, file icons shown on a user's display are dragged-and-dropped by a digital pointer into a receiver window 716, for example a computer mouse. When résumés have been uploaded, a finish position button 730 is selected and the job position is shown in position window 720, here being for a Sales Executive in window 722. The criteria file for the position is shown in criteria window 724, which can be retrieved by the user by pointer touching the position criteria file icon 730. In a Candidates window 736, a candidate file listing is shown in a candidate file icon window 738, whereupon a user's pointer touching on any candidate file within the file listing will retrieve a selected candidate file for review by the user.

FIG. 14 depicts a webpage dashboard of a job position applicants have undergone or undergoing the analysis by the methods described in FIGS. 1A-3. Here the job position dashboard 800 is for a sales executive in position listing bar 804. In a Sales Executive section 808 a table 810 having six columns including an action column 812, a rank column 816, a first name column 820, a last name column 824, a date added column 828, and a status column 830. In this depiction 15 candidates were offered for analysis, three determined to be qualified, six determined to be eliminated, and six pending analysis. The action column 812 has a review computer pointer engageable review button 832. The 15 candidates are numerically ranked in the rank column 816 from best qualified as number 1, to least qualified, as number 15. As shown in the status column 830, those candidates qualified with ranking numbers 1, 2, and 3 are deemed to have a qualified status. For those deemed unqualified, candidate positions having ranking numbers 10-15 are deemed to be eliminated. Thus candidates that have not yet undergone complete analysis are deemed to be pending, as shown for those candidates with ranking numbers 4-9.

Figure 15:
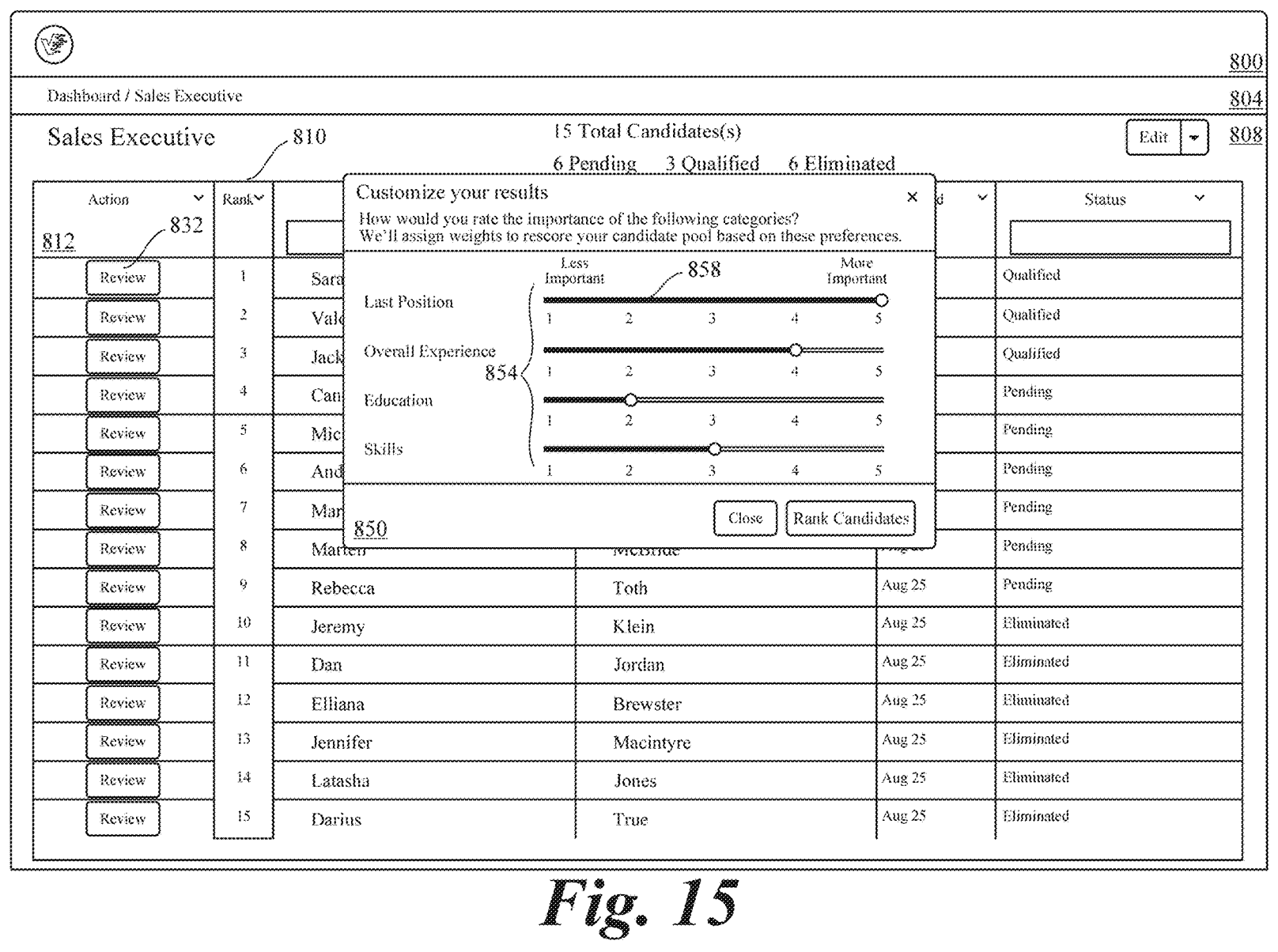

FIG. 15 depicts job position dashboard 800 dashboard overlaid with a user-adjustable selection criteria category-weighting adjustor 850 to allow re-ranking of job position applicants via the methods described in FIGS. 1A-3 using the weighted values of the user-adjusted criteria. The overlay of the category weighting adjustor 850 include four applicant selection criteria panel 854, each having a digital pointer engageable weight value slider control 858. The weight value slider control 858 has five increments ranging from "less important" to "most important". Here the four selection criteria panel 854 includes Last Position, Overall Experience, Education, and Skills. After readjustment of weight value adjustor control 858 among the four criteria listed in the selection criteria panel 854 is finished, a rank candidates button 862 is pressed via a digital pointer. Upon re-ranking, the candidate listing and their respective qualified, pending, and eliminated status are reviewed in the job position dashboard 800. Execution of the preferred and particular embodiments using the category-weighting adjustor 850 provides a depth of automatic analysis that through reiterative processes educates the users of the method, even those untrained to hiring managers. By utilizing the particular embodiment's methods and systems, the hiring manager or other reviewer starts from the top of the list and works their way down with a high likeliness that the ideal candidate is near the top.

Figure 16:
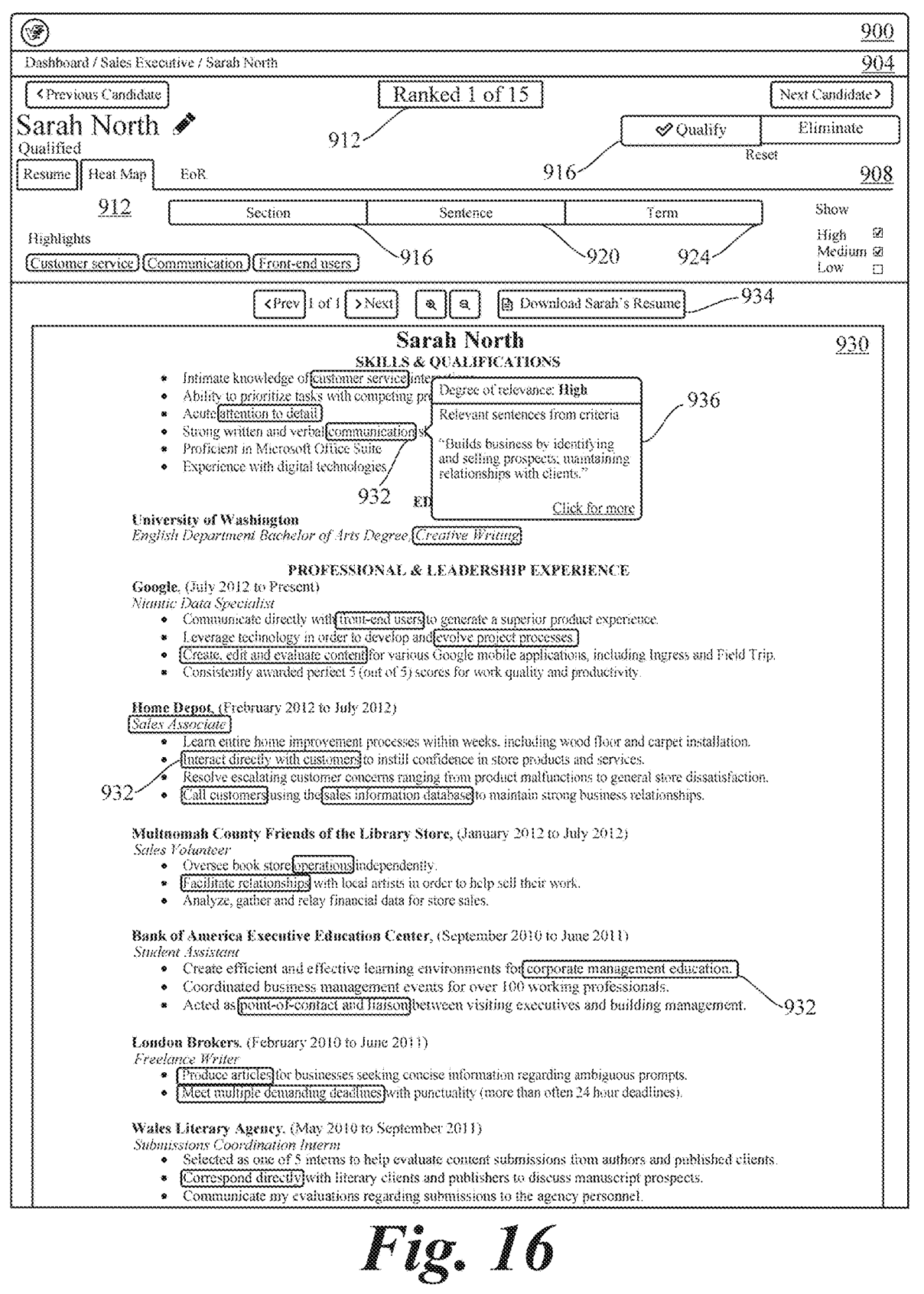

FIG. 16 depicts a webpage dashboard 900 of a ranking summary viewable by a hiring manager for an applicant's résumé 930 overlaid with a heat map 912 showing the relevance of applicant's experience expressed in the applicant's terms for the job position's requirements. The webpage 900 includes the name of the candidate in a status section 908. The status section 908 includes a ranking slot 912 and a status indicator 916. Shown is applicant "Sara North" who is deemed "qualified", is "Ranked 1 of 15" in the ranking slot 912 and is highlighted "Qualify" for the job position as shown by the adjacent check mark in the status indicator 916. Beneath the status section 908 the tap for the heat map 912 is engaged with a digital pointer to reveal the overlaid heat map components that populate the applicant's résumé 930 with a selection of encircled terms 932.

In general the webpage 900 provides for the microprocessor executable methods described in FIGS. 1A-3 to guide the hiring manager to review the applicant's résumé information source expressed in terms of the applicant's natural language. The webpage 900 employs the methods described in FIGS. 1A-3 above in which the natural language of a first information source is converted to a first concept vector and a plurality of second concept vectors, either obtained from the Concept Corpus 62 described in FIG. 1B, or the Secord Order Concept Map 108 from the Concept Base 104 described in FIG. 2, or the Concept Corpus 224 or Contextually Weighted Relevance value 234 described in FIG. 3. In an embodiment, the Concept Corpus 62, the Second Order Concept Map 108, the Concept Base 104, the Concept Corpus 224, or the Contextually Weighted Relevance value 234 are retrievable from the Knowledge Base 620 or the Database 618 of the Backend Server 614 of the Service Architecture system 600 described in FIG. 11.

During the review of the heat map 912 overlaid on the applicant's résumé 930, as the hiring manager moves or rolls a digital pointer over the webpage 900 within the heat map 912 a dialog box 936 appears to the user and points to one of the encircled terms 932. In this example the dialog box 936 points to "communication" within encircled term 932. The dialog box 936 displays a degree of relevance, "high", for the applicant's encircled term 932, and a statement of why the degree of relevance is deemed to be "high" as it matches the job position's requirement "Builds business by identifying and selling prospects; maintain relationships with clients". To other terms in the applicant's résumé 930, the dialog box 936 can migrate with the digital pointer movement as the cursor of the pointer rolls over various encircled terms 932. Other embodiments of the heat map 912 provide for encircled terms to be adjusted for different phrases by pointer-engageable buttons, for example section selection 916, the sentence selection 920, and the term selection 924.

The "heatmap" 912 over the résumé 930 shows which portions of a résumé most heavily contributed to the relevancy score of the candidate. A section that is more heavily shaded contains the sentences and words most strongly related to the job description. This type of information is a product of the concept vector representation and is possible using the particular embodiment's unique technology. This helps the user know exactly where to look when skimming a résumé. The user or hiring manager may down load the résumé with heat map by digital pointer by touching the Download Sarah's Resume button 934.

Figure 17:
FIG. 17 depicts a webpage dashboard of an evidence of relevancy that ranks the job applicant's résumé-stated skills with the job position's requirements.

FIG. 17 depicts a webpage dashboard of an evidence of relevancy, EoR, 950 that lists and ranks the job applicant's résumé-stated skills with the job position's requirements. Here, a series of job posting criteria, 951, 952, 953, 954, 955 is numerically ranked one through five with evidence from résumé sections 970. In rank-1, the sentence from the criteria "Builds business by identifying and selling prospects; maintain relationship with clients" is paired or matched within the evidence from résumé sections 970 by three résumé sentences 961. Similarly, in rank-2, the sentence from the criteria "Sells products by establishing contact and developing relationships with prospects; recommending solutions." is paired or matched within the evidence from résumé sections 970 by three résumé sentences 962. Rank-3, Rank-4, and Rank-5 for job posting criteria 953, 954, and 955 remain unpaired or unmatched with any evidence from résumé 970.

The hiring manager viewing the evidence of relevancy 950 sees instantly the strength of relevance of each of the concepts present in the given candidate's résumé. In another example, the most prevalent concept in Candidate A could be "Inside Sales" and "Lead Generation" in Candidate B. This is very useful information for the hiring manager to consider when making candidate selections. A key reminder here is that the specific terms of "inside sales" and "lead generation" don't need to be present in either Candidate A or Candidate B's résumés. The particular embodiment's concept vector representation makes this possible and the use of Abstract Semantic Analysis of Natural Language Text Using the Notion of Higher Order Conceptual Knowledge bases to construct ontologies of concepts allows for powerful analysis of similarities of job candidates on a level that would otherwise be impossible.

The particular embodiment's system utilization "evidence of relevance" 950 that is formed is based on an intermediary layer between easy-to-perceive ontologies, their realizations as abstract concepts, and their mappings between entity an target items. Another useful piece of information the hiring manager can access is how potential candidates compare to current employees already within the system. Analyzing how a particular candidate compares to a current high performing candidate helps to inform the hiring decision.

The embodiment's application enables anyone to rapidly make effective candidate selections with no domain knowledge or previous experience with reviewing résumés.

Alternate embodiments provide for a machine and a microprocessor executable method and system for determining the relatedness and meaning between at least two natural language sources. Portions of the natural languages are vectorized and mathematically processed to express the relatedness as a calculated metric. The metric is associable to the natural language sources to graphically present the level of relatedness between at least two natural language sources. The metric may be re-determined with algorithms designed to compare the natural language sources with a knowledge data bank so the calculated metric can be ascertained with a higher level of certainty.

Other alternate embodiments provide for a microprocessor executable method and system for guiding a user to modify an information source. Among the steps used include converting natural language of a first information source to a first concept vector and obtaining a plurality of second concept vectors from a concept knowledge database. Thereafter at least one similarity is determined between the first concept vector and the plurality of second order concept vectors upon which after the application of vector mathematical treatments of at least one similarity between the first concept vector and the plurality of second concept vectors stored in the concept knowledge database is calculated. When the first knowledge base is being written or edited, a locus within the first knowledge base is identified that has a significant relevance to the plurality of vectors extractable from the knowledge database. The user is then notified with a graphical overlay near the locus having significant relevance to the at least one similarity for selection by the user in the first document writing or editing.

An embodiment of the present invention provides a solution to these problems by allowing for an automated systematic review of candidates, which facilitates rapid and/or accurate hiring decisions even in the face of an otherwise overwhelming candidate pool.

Embodiments of the systems and methods fall under the umbrella of a broad class of systems known as matching algorithms. Generally, such systems provide mechanisms to match a set of entities to a set of targets. In one embodiment, the entities can be thought as "Job Descriptions" and "Job Candidates" which are the targets. The job of matching algorithms will be that they assign one or more of the targets to queries entities.

Embodiments of the invention allow for useful data to be efficiently extracted from any natural language source and analyzed in a way native to modern database models and technology without the need for neural networks or natural language processing techniques. New forms of natural language text information are easy to digest and incorporate into the analysis. This constitutes a new paradigm in data mining and analytics. The current application makes determinations using résumés. Integration of other data sources will further strengthen the reliability and versatility of such a system.

Embodiments of the invention automatically detect relevant concepts that are used to characterize items from entity or target space. One way to achieve this in any reasonable natural language description of entities or targets are sufficient to represent items. The set of available concepts that can be used to characterize items is flexible and extendible and their construction and application does not require manual curation.

Embodiments of the invention provide a qualitative evaluation of a candidate; a task which previously could only be performed by a human expert and still burdened by the presently identified problems. Embodiments involve analyzing the language a candidate uses within the résumé to describe their experiences and develop a semantic representation of a candidate's abilities, then compares this representation to an equivalent representation of the job description using a knowledgebase containing relevant information external to the analysis, and produces a metric representing the candidates qualification for the job in the context of résumé vs. job description, résumé vs. other résumés of candidates applying for the same job, and résumé vs. industry standard definitions of terms and/or conceptual intuitions.

Realization of embodiments of the invention is made possible through the use of a unique model for characterization and/or data mining involving capturing contextual semantics of textual information using a novel vector (concept) space representation. The state of the art methods for implementing semantic characterization and/or retrieval can be partitioned into three major paradigms: Keyword-, Ontology-, and NLP-Based. The first two models (Keyword- and Ontology-based) use keyword characterization and/or learning for semantic modeling and are capable of data mining via answering Boolean keyword queries. The latter model (NLP-based) search takes full query sentences as queries and perform search based on a combination of language-level syntax, linguistic facts, and/or lexical databases.

The keyword-based models utilize representations that are based on exact occurrence of keywords in their original or stemmed forms. The actual data mining can allow for exact similarity, approximate similarity, occurrence, or absence of the query keywords to those corresponding to stored documents. In contrast, the particular embodiment's model is not only capable of exact and approximation matching based on exact keyword inclusion and/or exclusion; it is able to perform data mining based on semantic similarity relations such as synonymy and anonymity.

The Ontology-based model for semantic characterization acquires the use of a vast amount of background knowledge for the construction of ontology structure associated with semantic content. It is this complex ontology structure that can be used to build the aspect model and can facilitate the search when mining the stored corpus. To build the aspect structure, the model may be trained through a curated set of similar statements describing the entities of the ontology. It is this complex curation process that makes ontology construction extremely inefficient. In contrast, embodiments of the inventive model do not require an explicit ontology construction. Instead it uses an efficient, high dimensional concept representation of specific entities. Another advantage of embodiments of the invention's representation is that it does not require manual curation of concepts and its implementation hinges upon a large number of facts (concepts) that the system makes efficiently accessible. The other contrast between the particular embodiment's approach and ontology-based model is that when used for retrieval purposes, the particular embodiment's model provides a relative score for similarity of a query document to those of a result set returned by retrieval algorithm, while the ontology based models are primarily used for knowledge discovery and not explicit semantic ranking among returned results.

In NLP-models, both texts go through a series of grammatical processing steps including parsing, dependency grappler processing, and/or phrase level modeling. To elevate such syntactic characterization to the level of semantic model, the NLP-model is usually augmented by information-extracted and semantic container elements to handle data mining applications. Beyond the complexity of building a hybrid model of syntactic and semantic elements, this model primarily handles queries in full sentences and makes similar assumption about the underlying stored documents. The particular embodiment's model in contrast avoids the syntactic characterization process and does not depend on the structure of the natural language. This makes it possible to handle queries or populated databases consisting of phrases, keywords, text snippets or complete sentences. This is a major advantage and key difference of the particular embodiment's model; it does not require explicit construction of a language model, does not depend on complete sentence structures to perform semantic characterization, is extremely efficient in terms of computational complexity, and uses efficient database retrieval systems.

This unique approach to natural language text analysis and comparison, coupled with the new applications in the industry of job search and hiring practice enabled by it, constitute the novelty of the present invention. The utility of which is realized through solving numerous problems with substantial social and economic impact for which there was previously no existing solution. No other system currently available solves these problems as effectively or applies this technology within the space of hiring.

The particular embodiment's work advances the state of the art in using ESA by marrying classic concept-based representation with fine grain ontologies to provide a concept representation which is trustworthy by end users. Specifically, the particular embodiment's system will use mappings to trustworthy domain concepts that was not possible before. Specifically, matching results are generated, the end user needs to understand what the justification for producing a specific matching between the query entity and target is. Presenting this in the form of a set of abstract concepts that agree between two items will probably fail the trustworthy test. Finally, the particular embodiments machinate in a computationally efficient way. It could be used for any document manipulation from disciplines ranging from social work, law enforcement, legal professions, patent entities, medical professions and sport professions. Any operating entity employing natural languages (conversational or obtainable from other mediums) can be collated into an aggregation of documents for determining how they relate, and then manipulate the documentation for optimized calculation of relevancy.

Embodiments of the invention allow for characterization of relationships between arbitrary texts for applications including but not limited to; determining qualification of a job applicant based on the conceptual relevance of a résumé or other biographical texts to a job description or posting; filtering a stream of texts such as news articles or online postings based on their conceptual relevance to a subject or sample text; and classifying a sample text within an ontology based on its conceptual substance. This systems and methods of semantic analysis of texts forms a foundation upon which subsequent inventions and embodiments described herein may be built.

Implementation of the systems and methods includes a NoSQL database engine which is capable of implementing a document database structure. The main motivation for using such an engine is that it is not necessary to make any assumption about the underlying schema of the data that can be analyzed or stored in the particular embodiment's system. This schema-free property is also critical in the particular embodiment's implantation of concept space representation for realizing semantic structure of textual information. Additionally, the NoSQL engine allows for efficient indexing and querying in document databases. This property forms the corner stone for implementing the concept-based search model. Finally, well-structured queries against a database of documents implemented as NoSQL database can be made to generate relevance-ordered results (payloads) that is critical in any scoring system.

In addition to an efficient NoSQL database engine, the particular embodiment's representation model uses a large number of facts to characterize the semantic content of documents. Each fact captures a concept in the domain of interest. The particular embodiment's system maintains a database of facts that is referred to as a knowledge base. Implementation of the knowledge base uses the aforementioned NoSQL document engine. Given a query document (e.g., job description), the similarity of the facts in the particular embodiment's knowledge base and the query document can be valued and represented a list of ordered pairs of the form (fact, relevancies). The set of all these pairs can act as the particular embodiment's concept vector representation of the query document. Specifically, to convert a natural language document into a concept vector representation, as depicted in FIG. 1B, the document body, say Input 12, representing a job description, is presented with the Knowledge Base 58 as a query and subsequent processing by the Lexical Semantic Characterization 16. The resulting output as a Concept Map 60 can represent a list of records in which the concepts from the Knowledge Base 58 which relate to the Input 12 document. The natural language is then discarded and the document or Input 12 is stored in the database as a collection of relevant concepts or vectors. This is the concept vector representation model.

When comparing a document to a corpus, such as shown in FIG. 1B, both the Input 12 document and the Corpus 14 are converted into a concept vector representation or "concept map". In this form, two concept maps may be compared using vector mathematical treatments. For example, cosine similarity may be applied between two concept vector representations to determine their similarity based on the distance between their concept vectors. In this way, natural language texts may be compared on the basis of their conceptual substance and not syntactical composition.

Consider the application in which a hiring manager seeks to gauge the potential qualification of a job applicant based on the conceptual substance of the applicant's résumé compared to a job description. In this application, a collection of descriptions of skills, duties, and job titles would serve as the knowledge base. First, the résumés are converted into a concept vector representation using the methods described above. This forms the corpus which queries can be made against. Next, the job description is taken as a query against the concept vector representation of the résumés. The concept map of the job description is compared to concept maps of the résumés and an ordered list is produced which indicates which résumés have the most semantically similar content to the job description. The strength of this similarity is presented to the manager as a score which is adjusted by the context in to a human readable form. The manager may use this ordered list of applicants and associated scores to predict how qualified a particular applicant is for the job at hand.

Preferred and alternative embodiments of the current invention provides systems and methods for determining the conceptual semantic relevance of a sample text within a corpus to a given input text; for scoring and ordering the texts comprising a corpus based on their conceptual semantic relevance to a given input text; for classifying an input text based on its conceptual semantic similarity to a sample text; for representing a given text as a collection of defining concepts in a machine readable format; for generating a machine readable collection of concepts from a given text; for searching and retrieving a set of documents based on their conceptual semantic relevance to a query; and for predicting the qualifications of a job applicant for a given job by comparing the semantic content of their résumé to that of a job description.

Example of problems solvable by embodiments of the invention:

A hiring manager has difficulty determining a meaningful difference between the résumés of qualified candidates as it relates back to a specific job description and what is required to perform the job at hand.

Example of solutions offered by embodiments of the invention:

A hiring manager is able to introduce any document into the contextual mapping environment to help differentiate résumés by their relevance rating for a given position and receives their ranked order list. Documents are indiscriminant from résumés, job descriptions or even transcription of voice conversations. The hiring manager is able to utilize and customize any combination of textual information that is relevant to "employment practices" to differentiate amongst two or more résumés. This allows for the separation of two résumés, which are typically linked, based on common hiring metrics such as years worked, job titles, skills listed and education.

Example of problems solvable by embodiments of the invention:

An employer and potential employee see transferable skills in relation to a résumé and job description but are unaware that their known semantic definitions do not actually align and are not the same. This leads to poor hiring practices and subpar matching of candidates to job descriptions.

Example of solutions offered by embodiments of the invention:

The semantic mapping environment allows for a 3rd party to verify that they were semantically on the same page as it relates back to the needs of the employer. The employer can utilize any definition or criteria of job responsibilities to have a résumé or conversation rated and ranked based on relevancy beyond standard hiring metrics such as minimum requirements for years worked, job titles, skills listed and education.

In accordance with additional embodiments of the present invention, a machine and a method are provided by which a text can be broken into separate semantic units, have each of those components analyzed separately with perhaps context dependent methods in a concept vector space, and have the results of these separate analyses fused in a semantically meaningful way. The present invention permits analysis of different parts of a text using contextually relevant techniques, and determining the importance of individual sections of a text to defining the relationship between texts, and subsequently using this importance to weight the analysis of those sections for the purpose of producing a score representing the overall relevance of one text to another.

FIG. 3 depicts a possible implementation of this process. In the example depicted, a classifier is used to divide an input document into logical segments based on the nature of their content. Next, Semantic Representation of Text in Relation to a Natural Language Knowledgebase is used to convert each segment into its respective concept map. A vector comparison is applied across the resulting list of concept maps in relation to the concept corpus. The resulting relevancies may be weighted separately depending on the content of their originating segment, and then combined to generate a contextually weighted relevance. Contextual weighting outlined in this diagram is one simple example of how analysis may be dynamically altered by context.

This allows the user of an application, based on the semantic concept mapping technologies described herein, to modify how analysis is performed and see how different semantic components contribute to the overall relevance. Not only does this provide the user a finer degree of control over the analysis process, it allows the user to understand the underlying mechanics of the system. The process could be presented in such a way to give the user a visual representation of how concepts contribute to overall relevance.

Consider an application where a hiring manager wants to sort résumé s based on semantic relevance to a job description to predict the qualification of a job applicant. Also, the hiring manager considers the most recently held job of an applicant to be a preferred indicator of qualification and performance. The application can allow the hiring manager to set a weight for each section of the résumé which can feed into the analysis by placing greater emphasis on concepts derived from heavily weighted sections. The end result is a list of résumé s ranked by relevancy to the job description but, more specifically, strongly ranked by the relevancy of the most recent job the applicant describes, to the description of the job they are applying for. The hiring manager could just as easily place emphasis on education or skills.

By the nature of DYNAMIC ADJUSTMENT OF ANALYTICAL METHODS BASED ON SEMANTIC CONTEXT, the example application can access the semantic contributions of individual sections of a résumé to the overall concept map. The application can be built in such a way to show the hiring manager which sections of the résumé are particularly relevant to the job description. Such visual representation may be accomplished through various means including charts, word pools, or a heat map. This gives the hiring manager confidence in their control over, and understanding of, the results given by the system. In addition, by allowing the hiring manager to see how concepts are contributing to the relationship between the résumé and job description, the hiring manager may learn to identify new relationships within résumés they had not previously considered, thereby educating and increasing the effectiveness of that manager in the future.

Preferred and alternative embodiments of the present invention provide systems and methods for characterizing résumés and job descriptions using a unified semantic model; for creating a semantic representation of a résumé which encodes weighted biases for different aspects of a résumé; for comparing résumés in terms of their semantic contents; for generating a ranked set of résumés in terms of their semantic similarity to a job posting; for generating a semantic characterization of an organization in terms of contents of résumé s associated with employees of the organization; for generating a semantically weighted representation of an organization in terms of contents of résumés associated with employees that work in that organization, with a weighted bias parameter for different members of the organization; and for utilizing the semantic characterization of an organization to enhance the candidate selection process.

Example of problems solvable by the preferred and particular embodiments: An employer wants to evaluate certain aspects of a résumé against those of existing employee résumés or textual description associated with the company (within the context of the entire company corpus) to determine the viability of candidate for employment.

Example of solution offered by embodiments of the invention: The employer is able to have multiple résumés and aspects of those résumés semantically characterized and ranked based on their contextual relevancy to the corpus of the company or aspects of the corpus.

Preferred and alternative embodiments of the current invention provide systems and methods to define a person at the instant for which someone defines them; to have no job titles for individuals until a collection of their capabilities creates a job title; for allowing one person to be defined by one or multiple people seeking varying skill sets; for allowing one person to present themselves in a singular fashion and not having to produce multiple résumés or profiles of themselves to fit different job positions; to recommend a job title(s) to an individual based on their capabilities from either their résumé and/or employment markup language; for a person to be considered for work in unrelated fields at the same time with one biographical of themselves; to prevent missed opportunities by not being able to present a complete picture of their work capabilities; that utilizes all experience a person has gained in life to allow a third party to define what jobs that person is capable of performing; that defines individuals based on capabilities and does not predefine them into rolls; that generates a definition of a person once there is someone seeking to find a person with particular capabilities; that generates unique job titles based on the criteria of the person observing a potential job candidate; and for defining someone in almost infinite ways based on unique combinations of their capabilities and attributes.

Example of problem solvable by the preferred and alternate embodiments: With people broadcasting a professional biographical of themselves on social sites such as LinkedIn or others, they are unable to have multiple descriptions of themselves, even though they may be interested in unrelated job positions, because it could prevent them from gaining an opportunity with new employment in varying fields of work. Based on best practices when looking for new candidates to hire, there is a need to find candidates who appear to be specialized in a domain that can benefit the company. Therefore people seeking new employment in unrelated fields limit their opportunities to achieve their desired outcome.

Example of solution offered by embodiments of the invention: Dynamic Career Language allows individuals to be able to be perceived as having related "domain" knowledge in unrelated fields of work at the same time for as many varying fields of work they are able to fit.

Example of problem solvable by the preferred and alternate embodiments: When applying for a new job, individuals tend to generate multiple versions of their résumé in order to appear to be a better fit at each potential new employer. This means that every time an individual finds a new job posting to apply to, they have to change themselves to be better perceived by the company who posted the job opening.

Example of solution offered by embodiments of the invention: Dynamic Career Language prevents individuals from producing multiple static résumé versions of themselves.

Example of problem solvable by the preferred and alternate embodiments: When a hiring manager or recruiter is searching for new candidates via job title search, they are presented with people who have potentially incorrectly labeled themselves as a title under one that you are searching for. This causes wasted time for the hiring manager or recruiter and makes the search less efficient.

Example of solution offered by embodiments of the invention: Dynamic Career Language prevents people from mislabeling themselves saving time and resources for the hiring manager or recruiter. The individuals they seek can be defined at the time of their search creating a list of potentials candidates that are all relevant to their search.

Preferred and alternative embodiments of the particular embodiments provide for a system, based on a standardized process such as Dynamic Career Language and/or some other method which defines persons and job opportunities in the same context as each other, to build a path and/or plan of action to an employment goal that has been targeted to achieve in the future. It allows for persons in the labor force to understand all different opportunities in their lifetime to achieve a targeted employment position and the odds of attaining said position through varying paths which can be selected by the individual; a system and method for persons to target a job they wish to attain in the future, have it analyzed using Employment Markup Language and/or some other method and be recommended which course of action is best to achieve their employment goal; a system and method to use mapping features to attain a targeted job in the future by comparing it to an existing résumé and/or C.V. to perform a gap analysis to determine one and/or multiple ways to fill the gap by enhancing and/or adjusting attributes of person seeking future position; a system and method for a person to compare existing career threads of other persons who have achieved a desired position to be attained in the future and building a gap analysis of recommendations on how best to gain attributes to attain future role; a system and method to deconstruct one or multiple persons career paths into Dynamic Career Language and/or some other method to produce varying Career Threads to show variations to achieve future employment; a system and method to view career advancement not through job titles and/or salary but through capabilities and attributes; and a system and method to understand career advancement through the intangible qualifications of an individual.

Example of problem solvable by the preferred and alternate embodiments: A person desires that they want to attain a job position in the future but doesn't know the best course of action to take. They can assume that they are making the right choice but there is no standardized process that can analyze the future position and all other positions that might lead to attaining said position and provide recommendations on both standard and/or alternative options to attain the desired future job.

Example of solution offered by embodiments of the invention: When a person is present with a career thread on how to attain a desired future position, it can recommend the best jobs to take even if there are no clear positions available to the person due to lack of skills or geographical location. It can give them specific understanding of what skills they are attaining in unrelated jobs and how to build differing attributes to become a more qualified individual.

Dynamic Career Language utilizes a source of information from which to build definitions of industry terms and job titles. As Dynamic Career Language seeks to produce a definition which may be received as an industry standard, the generated definitions must represent a cross section of the industry from which they are from. Such titles may be curated by a committee of experts for example, but this would be a costly and time intensive task. This method would also suffer the same trappings Dynamic Career Language is meant to solve. Namely reliance on the opinions of an individual or small group of individuals. Also, a committee of experts could easily fail to define emergent terms which are rapidly evolving in definition such as those used by the software industry. In addition, there is utility in being able to reproduce a summary description of a job title for the purposes of educating job applicants and hiring managers. A preferred source of information is immediately current and does not rely on any individual perspective but rather represents the average opinion of an entire industry.

Crowd-sourced Résumé Descriptions is a method of collecting and refining knowledge about a career, job title, or industry from many diverse data sources provided by the general public. This information may come from résumés, job postings, or publications and could be collected at the moment of publishing via the internet. This in turn constitutes an information source which is highly current, as well as distributed and captures the average opinions of an entire industry to solidify the definition of industry related terms and titles.

In a possible embodiment of this invention, a series of résumés is processed by a text parser to extract job titles as they appear on the résumé, as well as the text the résumé author uses to describe the work they have done under that title. Many varying definitions of the same job title are captured with a sufficient number of résumé s; each written by a different individual. Multiple natural language definitions of a single title are concatenated into one text and then converted into a concept vector space using Semantic Representation of Text in Relation to a Natural Language Knowledgebase. Once a concept ontology has been created for a given title, other definitions of the title may be compared for relevancy by converting the other definition into the concept vector space and performing an abstract semantic comparison. FIG. 9 shows this process. In this diagram, a multiple crowd-sourced documents containing descriptions of a particular job title are combined to form a standardized representation of that title.

The process may be reversed by identifying which elements of the source title definition text contribute most strongly its semantic characterization, and combining those textual elements to produce a summary definition which captures the essence of that title. Furthermore, source definitions from résumés and job postings may be combined with corresponding context such as company or region of origin to define the duties of a job with respect to a specific country, organization, or department of an organization. This lends flexibility and specificity when Crowd-sourced Résumé Descriptions are used to develop Dynamic Career Language. An embodiment of this invention also allows Dynamic Career Language to change over time as the state of the industry evolves by continuously capturing live data from general public and automatically combining it into the current semantic representation of a job title or term.

Further preferred and alternative embodiments of the current invention provide methods and systems applicable for crowdsourcing descriptions from persons résumés to combine into one master description of said work; for crowdsourcing descriptions from persons résumés with the description from the employer of said positions, to combine into one master description of said work; for identifying outliers in job descriptions on résumés and/or curriculum vitae (C.V.) when crowd-sourced together; for identifying common job traits, attributes, duties, accomplishments etc. when crowdsourcing persons description of work or experience on their résumé and/or C.V.; for combining varying descriptions on a résumé written by unique individuals into one collective description; for converting multiple experience descriptions into one single description; for allowing 3rd parties to better understand and receive a more full description of an experience through crowd-sourced descriptions from unique persons and the organizations description; for taking multiple unique persons varying title presentments of the same job position and identifying the correct and/or most dominating title; for taking multiple unique persons varying title presentments of the same job position combined with the companies own title presentment of the same positions and identifying the correct and/or dominant title; for converting multiple job title presentments into one master title; and for helping 3rd party observers of multiple unique positions that their varying title presentment may be describing the same job position.

Example of a problem solvable by the preferred and particular embodiments of the invention: Multiple people apply to the same position at a new company from company "x". All people applying to the new position possess different titles at their previous company but were all applying to the same position at the new company. If they all have different titles at their previous employment then they need to have all have different skill sets yet are all applying to the same position. Example: Inside sales can be commonly described as; business specialist, account manager, product specialist, customer sales, account services etc.

Example of solution offered by embodiments of the invention: Crowd-sourced Résumé Descriptions solve the issue of mistaken job position titles by providing one title to previously varying title presentments. This helps 3rd parties who are reviewing candidates to understand that they all came from the same role and not different positions.

Example of problem solvable by the preferred and alternate embodiments: A person is generating their résumé to share with other people but struggle to understand what parts of their job are pertinent or not and how to describe the work they do.

Example of solution offered by embodiments of the invention: Crowd-sourced résumé descriptions solves this problem by allowing that person to write down what they feel is the most accurate description and then have it added to the collective pool to receive a more standard description which supersedes their own opinion.

Example of problem solvable by the preferred and alternate embodiments: A hiring manager has a résumé that they like but do not know if the person described themselves correctly or not.

Example of solution offered by embodiments of the invention: Crowd-sourced résumé descriptions allow that hiring manager to read the master description of said job and then see how that person compares to the collective.

Example of problem solvable by the preferred and alternate embodiments: A hiring manager did not interview someone because their description of a job was perceived accurate.

Example of solution offered by embodiments of the invention: Crowd-sourced résumé descriptions prevent missed opportunities from occurring because people can ensure that they properly described themselves.

Example of problem solvable by the preferred and alternate embodiments: A person produces a résumé and they didn't know that there were aspects of their job which they should have added to the descriptions of their experience.

Example of solution offered by embodiments of the invention: Crowd sourced résumé descriptions allow persons to have confidence that they didn't forget to add descriptions about themselves that could be beneficial to achieving a desired outcome.

Résumé s are the gold standard for presenting the qualifications of a job candidate. The résumé is also often the first impression a candidate gets to make on a potential employer and that impression dictates whether the candidate may be allowed the chance to be interviewed or further considered for a job. As such, there exists an enormous pressure on the part of a candidate to stand out and make themselves appear as impressive as they can on their résumé. This can lead to the unfortunate inaccuracy of a résumé. The candidate might list pseudo experience where they have technically held a particular job or have been exposed to a qualifying skill but are not truly proficient at it as their résumé might have a reviewer believe. In extreme cases, a candidate might also simply lie about their experience and proficiencies or otherwise inflate their résumé in a way which is misleading. In other cases, a candidate may actually possess qualifying experiences but not realize they are pertinent to list on their résumé or may otherwise be unable to articulate those attributes in a way that is apparent to a reviewer. These incidents complicate the hiring process and can lead to sub optimal hiring decisions which cause economic damage, in wasted time and resources, and block qualified people from reaching their full career potential.

Crowd-sourced Résumé Validation Score is a method of quantitatively determining the accuracy of content within a résumé. Utilizing Crowd-sourced Résumé Descriptions, it is possible to know the common duties and skills associated with a give job role and thus determine if a description of that role is accurate or not and to what degree. An embodiment of this invention provides a powerful tool for hiring managers to detect possible résumé inflation and grants the opportunity to avoid wasting time on candidates who fabricate past work experience or to ask more probing interview questions to better understand the true qualifications of a candidate. For example, FIG. 10 depicts a hypothetical job posting and the résumés of two candidates for that job. The diagram illustrates the difference between intuitive practice of using keywords to screen a résumé, and using Crowd-sourced Résumé Validation score based on semantic abstraction.

This is a task which currently relies on the experience of an individual to detect subtle or instinctual markers within a body of text which gives them a gut feeling of whether or not the statements within are accurate. All too often however, hiring managers are not experienced enough to make these distinctions or make incorrect conclusions based on psychological factors. Thus current methods are unreliable at best and damaging at worst. Crowd-sourced Résumé Validation Score can leverage the power of Semantic Representation of Text in Relation to a Natural Language Knowledgebase to convert statements of past experience provided in a résumé into a concept vector space, allowing conceptual semantic comparison of content to true Dynamic Career Language to provide an objective and repeatable metric for how well the author understands the experience they are writing about and thus gauging the likelihood they have misrepresented that experience.

Preferred and alternative embodiments of the current invention provide methods and systems for combining multiple descriptions of similar life experience to produce a "master" description of that experience; for verifying if how someone has described an experience is accurate when compared to a collective of similar descriptions; for comparing written documents, voice recordings and/or videos against each other to produce a "master" description of an experience; for scanning a résumé to produce a verification score for each experience listed by a person; for recommending descriptions of experience based off of a master description; for pointing out aspects of experience that are verified or unverified based off of a master description; for utilizing standardized résumé formats such as Employment Markup Language or some other method, to generate a master description of an experience; to verify experience descriptions based on the Crowd-sourced Résumé Validation Score and/or some other form of verification in social and/or online environments that are used for the purpose of professional networking and/or employment opportunities; to automate the process of verifying experience description in social and/or online environments that are used for the purpose of professional networking and/or employment opportunities; for hiring managers and/or recruiters to receive a verification score against multiple experience descriptions from multiple persons simultaneously; for persons in the labor force to have their experience descriptions verified so that they know if they are accurately representing themselves and the experience that they had; for verifying if a person ever had a particular experience based on the lack of common descriptors when compared to a larger body similarly described experience; for authenticating the validity of a résumé and its accuracy. Accuracy %+additional info to improve accuracy; for authenticating that the person presenting their résumé is the person described in the résumé; and for authenticating a résumé based on a number of collective data such as but not limited to job titles and companies, length of service at the company, length of service at a specific position at the company, education enrollment, Educational achievements, professional credentials, skills, volunteer, awards, and patents.

Example of problem solvable by the preferred and particular embodiments of the invention: When a hiring manager is looking at résumés and/or some other form of job application from a potential candidate, there is no way for them to know if how that candidate has described themselves is accurate or not without doing research on every experience. This brings possible confusion or missed opportunities to the hiring process.

Example of solution offered by embodiments of the invention: Crowd-sourced Résumé Validation Score allows a hiring manager to understand how much of each experience description is similar to others who also had or has that same and/or similar experience.

Example of problem solvable by the preferred and alternate embodiments: Persons in the labor force when producing a résumé of themselves do not always know the best way to describe themselves and have the potential to over describe or under describe the experience that they have or have had. This could potentially eliminate them from being considered for a new job or promotion they desire.

Example of solution offered by embodiments of the invention: Crowd-sourced Résumé Validation Score allows the person producing a résumé to better gage how accurate the description of themselves are and what parts are common or uncommon when compared to the larger body of work.

Other particular embodiments of the invention are focused in the space of hiring, applications may exist in any domain where natural language data need to be compared and classified. Consider the following application examples:

1. The United States Patent and Trademark Office currently maintains a publicly accessible database of patent applications and grants. This database is searchable by keyword. When searching for prior art relevant to a patent application, keywords are not a strong indication of the intellectual content of a patent document. The particular embodiment's system may be employed to efficiently compare the semantic content of a patent application to that of the USPTO database and reveal prior art which contains similar conceptual substance to the application. Such an application could greatly expedite public research and internal review processes.

2. Consider an aggregate of news feeds from numerous online sources. A reader wants to filter for news articles related to a specific story. In the past, the reader may search the articles based on keywords. Depending on the source, articles may also be tagged or organized by topic. However, both of these filtering schemes only address sorting of articles by topic, not by details of the story. Using a simple implementation of the particular embodiment's semantic search system, a reader could identify a particular article with a story they would like to track. Then the particular embodiment's system would find articles with similar conceptual substance, not just similar topics or keywords. For example, if the input article was about "Stock market ramifications of an event that happened to Company A", rather than returning all articles about "Company A", the particular embodiment's system would specifically return other articles analyzing the event that happened at "Company A" and how the event impacts the market.

3. Many chat services exist facilitating communication via email, text message, audio, and video. Some of these services are free to the end user and rely on revenue from advertisements. Online advertisement services utilize website context, tracking cookies, and other demographic markers to profile a user and serve advertisements which are specifically targeted at them. The particular embodiment's technology provides for a new form of advertising service whereby ads are served, not just on demographic markers, but the context of the conversation itself. Natural language of the conversation taken from raw text or from text converted from audio can be used as a query against a dataset of concept mapped advertisements. The user would then see advertisement for products and services relevant to the conversation at hand. For example, someone chatting with a coworker about places to eat lunch would begin seeing advertisements for local restaurants offering lunch specials related to their conversation.

4. In a society which maintains constant communication with the world through social media, readily available records of conversations between parties may offer powerful evidence in court cases and other law enforcement scenarios. However, this data can be overwhelming to search through manually and keyword based searches only guarantee retrieval of conversation containing those exact words and not necessarily pertaining to the subject of interest. The particular embodiment's semantic search technology could be employed to map millions of conversation samples into a concept vector representation. At which point, conversations may be searched for semantic subject material and not simply keywords which may appear in relevant and irrelevant text samples.

Particular embodiments may be implemented via software as a service, or SaaS model assessable from remote servers. In the SaaS model data science obtained driven from the résumé screening tools provided in the embodiments may be utilized by recruiters and hiring managers. The particular embodiment's résumé screening application utilizes the present invention to address these industry pain points with a straightforward approach.

3. Sort candidate list. Upon receipt of files, the particular embodiment's system begins conversion of the résumé documents into a concept vector representation. Documents are searched for millions of concepts. 1000 component vector is formed which comprises the magnitude of relevancy of the 1000 most relevant concepts to the document. This concept map is then used as a basis of semantic comparison to the original job description. The application then orders the résumés based on their conceptual relevance to the job description.

Once all résumé files are uploaded, the Map Positions service will call cvlib.UnifiedIndex.rank( ) which will take the job position criteria from earlier and use it as a query to search the newly created database of résumés. UnifiedIndex.rank in this code base may be used to perform a purely text based search consistent with common industry standard search methodologies, or it may be set to perform a purely concept based semantic search using the particular embodiment's novel technology embodying the present invention. It may also do both simultaneously and combine the results using a weighting scheme. In practice however, users tend to rely primarily or solely on the particular embodiment's novel concept search for this application.

```
# Excerpt from cvlib.py beginning line 1071
    def rank(self, query, filter=None, start=0, count=1000, concept_weight=0.5,
        absolute_rank = False):
        '''
        Query the database and retrieve list of all documents sorted by their
        relevancy to the query. Performs both text based and concept vector
        based search and combines the results of each to produce an overall
        score for each result.
        query - A dictionary of tuples containing text sample and weight pairs.
            ie. the query.
        filter - Fields by which to filter results.
        start - Starting index for returning results.
        count - Number of results to return.
        concept_weight - How strongly to weight concept search results when
                combining with text search results.
        absolute_rank - Flag indicating to calculate an absolute correlation
                score between the query and a give matched document.
        Returns a list of tuples of search results.
        '''
        try:
            text_matches = { }
            text_count = 0
            conc_matches = { }
            conc_count = 0
            end = start + count
            if concept_weight == 0.0:
                # If concept search weight is 0.0 then only do text search
                [text_matches, text_count] = self.rank_by_text(query, filter,
                    start, count)
            elif concept_weight == 1.0:
                # If concept search weight is 1.0 then only do concept search
                [conc_matches, conc_count] = self.rank_by_cvr(query, filter,
                    start, count)
            else:
                # Else, perform both searches
                [text_matches, text_count] = self.rank_by_text(query, filter, 0,
                    end)
                [conc_matches, conc_count] = self.rank_by_cvr(query, filter,
                    0, end)
            # Combine results of both searches
            matches = self._combine_rank(query, text_matches, conc_matches,
                start, count, concept_weight, absolute_rank)
            return [matches[start:end], len(matches)]
        except xap.DatabaseOpeningError:
            return [[ ], 0]
```

The rank method will convert the job criteria into a concept vector representation and use this mapping to compare the conceptual substance of the criteria to that of the résumés using vector maths. All résumés in the set are returned by the query but the result set is sorted from highest relevancy to lowest. A score is also associated with each résumé indicating a relative degree of relevancy to the job criteria. This score is then normalized by a linear function which takes into account typical distributions of results and converts the score into a percentage. The sorted list of résumés and scores is returned to the frontend webserver by the Map Positions service where it is typically displayed to the user in a graphical format such as a gauge.

This means that the first time the hiring manager views the list of candidates, they are ranked in order of relevance. This ranking can fine-tuned based on what attributes the hiring manager values most in new hires. Tweaking the way the relevancy is calculated gives the hiring manager complete control over their results and the candidate selection they are making. This control is accomplished through employment of Dynamic Adjustment of Analytical Methods Based on Semantic Context. In this application, a third party parsing service is used to identify the components of the résumé document. The application then allows the hiring manager to place emphasis on particular components during analysis to achieve a fine grained control.

The cvlib.UnifiedIndex.rank method and the cvkb.KnowledgeBase class are built for Dynamic Adjustment of Analytical Methods Based on Semantic Context. As such, these methods accept documents in the form of a collection of text segments with associated weights. When the document is converted into a concept vector representation, each segment is converted into a separate vector and these vectors are multiplied by a weighting factor and summed to produce a general concept vector for the whole document. At this level in the code, it is assumed the task of parsing the résumé into logical segments and allowing the user to assign weights to those segments is already completed by the application. See KnowledgeBase.concept_vector which converts a document or segments of a document into a concept vector. concept_vector iteratively calls_concept_vector for each segment. Conversion to the concept vector representation occurs within_concept_vector.

```
# Shown below, cvkb.py library for converting natural language text into a concept
vector representation:
'''
cvkb.py
Python 2.7
Abstraction over cvlib.BasicDBIndex which manipulates a concept vector
representation.
'''
# Python builtin packages
import os, sys, re, math
# Internal packages
from cvlib import BasicDBIndex, DEFAULT_CVR_FLAG
# Class definitions
class KnowledgeBase(BasicDBIndex):
    '''
    Wrapper around BasicDBIndex which provides abstract methods for converting a
    natural language text into a concept vector representation based on a given
    knowledge base.
    '''
    CONCEPT = 0
    TITLE = 1
    def __init__(self, **kwargs):
        if not 'dbPath' in kwargs:
            kwargs['dbPath'] = os.path.join(os.path.dirname(__file__),
                './knowledgebase')
        BasicDBIndex.__init__(self, **kwargs)
    def _concept_vector(self, queryString, start_offset=0, end_offset=250,
        flags=DEFAULT_CVR_FLAG, removeStopWords=True, getTitle=False,
        normalized=False):
        '''
        Transform an input text into a concept vector representation.
        query String - Sample text to use as a query.
        start_offset - Starting index for returning results.
        end_offset - Ending index for returning results
        flags - Bit mask which tells Xapian how to build queries.
        removeStopWords - Flag specifying removal of stopwords from a query.
        getTitle - Include titles of concepts in results
        normalized - Normalize vector.
        Returns a dictionary of tuples containing the concept vector
        representation of the input text.
        '''
        # Convert a text sample into a Xapian query object
        query = self.parse2(queryString, flags, removeStopWords)
        # Search the database from the generated query
        matches = self.search(query, start_offset, end_offset)
        Vec = { }
        Cons = { }
        Titles = { }
        # Build list of concepts
        for match in matches:
            did = match.docid
            doc = match.document
            Cons[did] = doc.get_value(KnowledgeBase.CONCEPT)
```

```
            Titles[did] = None
            if getTitle:
                Titles[did] = doc.get_value(KnowledgeBase.TITLE)
        if normalized:
            # If normalized flag is set, build normalizing factor by root mean
            # squared of relevancies.
            vlen = 0
            for item in matches.items:
                tempf = float(item[1])
                vlen += tempf * tempf
            vlen = math.sqrt(vlen)
        # Build a vector from the match scores
        for item in matches.items:
            docid = item[0]
            relevance = item[1]
            if normalized:
                # If normalized, divide relevancy by normalizing factor
                tempf = float(item[1]) / vlen
                relevance = str(tempf)
            concept = Cons[docid]
            title = Titles[docid]
            Vec[item[2]] = (docid, concept, relevance, title)
        return Vec
    def scaleVec(self, tv, s):
        '''
        Multiply a vector by a scalar.
        tv - Dictionary of tuples containing a concept vector representation
        s - Scalar value
        Returns a dictionary of tuples containing a concept vector
        representation.
        '''
        for i in tv:
            # Multiply the relevancy of each concept in the vector by the scalar
            tv[i]= (tv[i][0], tv[i][1], tv[i][2] * s, tv[i][3])
        return tv
    def addVecs(self, tv1, tv2):
        '''
        Combine two concept vectors.
        tv1 - Dictionary of tuples containing a concept vector representation
        tv2 - Dictionary of tuples containing a concept vector representation
        Returns a dictionary of tuples containing a concept vector
        representation.
        '''
        len1 = 0                # Length of vector
        relVec1 = { }           # Dictionary of relevancy values
        flagVec1 = { }          # Dictionary of flags
        idxVec1 = { }           # Dictionary of index values
        # Generate intermediate vectors from concept map 1
        for i in tv1:
            relVec1[tv1[i][0]] = tv1[i][1]
            flagVec1[tv1[i][0]] = False
            idxVec1[tv1[i][0]] = i
            len1 += 1
        len2 = 0                # Length of vector
        relVec2 = { }           # Dictionary of relevancy values
        flagVec2 = { }          # Dictionary of flags
        idxVec2 = { }           # Dictionary of index values
        # Generate intermediate vectors from concept map 2
        for i in tv2:
            relVec2[tv2[i][0]] = tv2[i][1]
            flagVec2[tv2[i][0]] = False
            idxVec2[tv2[i][0]] = i
            len2 += 1
        resVec = { }            # Result vector representation
        idx3 = 0                # Index counter
        for docid in relVec1:
            # For every component in this vector, check to see if the other
            # vector possesses that component. If so, sum their values.
            if not flagVec1[docid]:
                # If this concept is flagged False
                flagVec1[docid] = True
                idx1 = idxVec1[docid]
                if docid in relVec2:
                            # If the concept exists in the vector 2
                            # Set flag in vector two so we don't revisit later
                            flagVec2[docid] = True
```

```
                                idx2 = idxVec2[docid]
                                # Sum the relevancies of this concept from each
vector
                                newRel = tv1[idx1][2] + tv2[idx2][2]
                        else:
                                # If the concept is only in this vector, nothing to
sum
                                newRel = tv1[idx1][2]
                        # Append component to the new result vector
                        resVec[idx3] = (docid, tv1[idx1][1], newRel, tv1[idx1][3])
                        idx3 += 1
                for docid in relVec2:
                        # Now add all components from vector 2 that were not also in
vector
                        # 1 to the result vector.
                        if not flagVec2[docid]:
                                # If we didn't flag it while looking at vector 1
                                flagVec2[docid] = True
                                idx2 = idxVec2[docid]
                                # Append component to the new result vector
                                resVec[idx3] = (docid, tv2[idx2][1], tv2[idx2][2],
tv2[idx2][3])
                                idx3 += 1
                return resVec
        def concept_vector(self, li, start_offset=0, end_offset=250, returns_size=250,
                flags=DEFAULT_CVR_FLAG, removeStopWords=True, getTitle=False,
                normalized=False):
                '''
                Generate concept vector representation from a set of sample texts.
                Wraps _concept_vector to take a list of text segments comprising a full
text
                and generate individual concept vector representations for each. Then
                multiply each vector by an associated scalar and add them together to
                produce a single result vector that will serve as the concept vector
                representation of the input document.
                li - A dictionary of tuples containing text sample and weight pairs.
                    ie. the query.
                start_offset - Starting index for returning results.
                end_offset - Ending index for returning results
                returns_size - Maximum number of components in vector
                flags - Bit mask which tells Xapian how to build queries.
                removeStopWords - Flag specifying removal of stopwords from a query.
                getTitle - Include titles of concepts in results
                normalized - Normalize vector.
                Returns a set of the most relevant concepts to the query as a vector.
                '''
                Vec = { }
                Cons = { }
                Titles = { }
                for itm in li:
                        scalar = 1
                        text = " "
                        if isinstance(itm, tuple):
                                # If itm is a text / weight tupled pair, extract the
components
                                text = itm[0]
                                scalar = itm[1]
                        elif isinstance(itm, str):
                                # If itm is a string, assume the default scalar of 1
                                text = itm
                        # Get a concept vector representation for this segment
                        itmVec = self._concept_vector(text, start_offset=start_offset,
                                end_offset=end_offset, flags=flags,
                                removeStopWords=removeStopWords, getTitle=getTitle)
                        # Apply the scalar value to the vector
                        tmpVec = self.scaleVec(itmVec, scalar)
                        # Add the scaled segment vector to the main vector
                        Vec = self.addVecs(Vec, tmpVec)
                # Sort the components of the vector by their magnitude
                keys = sorted(Vec.keys( ), key=lambda x: Vec[x][2], reverse=True)
                idx = 0
```

```
    resVec = { }
    for k in keys[:min(returns_size, len(keys))]:
        # Build a result vector of maximum dimension return_size from
the
        # most relevant concepts
        resVec[idx] = Vec[k]
        idx += 1
    return resVec
```

Let's assume that the hiring manager thinks that the last position a candidate held is a solid indicator of their potential success at his/her company. If the hiring manager marks "Last Position" as more important, the particular embodiments described above knows to give the last position a higher weight when calculating candidate relevancy.

4. Review candidate in detail. The hiring manager reviews each candidate in more detail. By clicking on each candidate, the hiring manager is able to see a detailed analysis of the elements within the candidate résumé. Beyond flagging for keywords, misspellings, etc. the particular embodiment's application provides a depth of analysis of the candidate unprecedented in the HR software space.

5. Make hiring decisions. After reviewing candidates in detail with the particular embodiment's application, the hiring manager has all the information to make immediate, educated decisions. A task which previously took days may now take minutes and is more reliable and repeatable than current standard hiring practices. Alternate embodiments of the invention provide for insight gleaned from candidate résumés used as the primary input by providing proposed questions for the hiring manager to ask during interviews.

While the preferred embodiment of the invention has been illustrated and described, as noted above, many changes can be made without departing from the spirit and scope of the invention. Accordingly, the scope of the invention is not limited by the disclosure of the preferred, particular, and alternate embodiments. Instead, the invention should be determined entirely by reference to the claims that follow.

The embodiments of the invention in which an exclusive property or privilege is claimed are defined as follows:

1. A microprocessor executable method to ascertain relatedness between information sources, the microprocessor executable method comprising:
    converting natural language of a first information source to a first concept vector, wherein converting natural language of a first information source to a first concept vector includes processing the first information source within a lexical semantic characterization, and further wherein the concept vector is a concept-based representation of at least a portion of the first information source;
    converting natural language of a second information source to a second concept vector, wherein converting natural language of a second information source to a second concept vector includes processing the second information source within a lexical semantic characterization, and further wherein the concept vector is a concept-based representation of at least a portion of the second information source; and
    determining a similarity between the first concept vector and the second concept vector; and
    calculating a metric of the similarity.

2. The microprocessor executable method of claim 1, wherein determining the similarity comprises vector mathematical treatments applied to the first concept vector and the second concept vector.

3. The microprocessor executable method of claim 1, wherein calculating the metric of the similarity includes expressing the metric as at least one of a conceptual relevance score, a conceptually weighted score, a word pool, a first heat map associable with the first information source, a second heat map associable with the second information source, and a graphic representation signifying the evidence of relatedness between the first information source and the second information source.

4. The microprocessor executable method of claim 1, wherein at least the first information source is a résumé.

5. A microprocessor executable method to ascertain relatedness between information sources, the microprocessor executable method comprising:
    converting natural language of a first information source to a first concept vector, wherein converting natural language of a first information source to a first concept vector includes processing the first information source within a lexical semantic characterization, and further wherein the concept vector is a concept-based representation of at least a portion of the first information source;
    converting natural language of a second information source to at least one second concept vector, wherein converting natural language of a second information source to a second concept vector includes processing the second information source within a lexical semantic characterization, and further wherein the concept vector is a concept-based representation of at least a portion of the second information source;
    ontologically corn paring the at least one second concept vector with a concept knowledge database;
    producing a second order concept vector from the ontologically compared at least one second concept vector;
    determining a similarity between the first concept vector and the second order concept vector; and
    calculating a metric of the similarity.

6. The microprocessor executable method of claim 4, wherein determining the similarity comprises vector mathematical treatments applied to the first concept vector and the second concept vector.

7. The microprocessor executable method of claim 4, wherein calculating the metric of the similarity includes expressing the metric as at least one of a conceptual relevance score, a conceptually weighted score, a word pool, a first heat map associable with the first information source, a second heat map associable with the second information source, and a graphic representation signifying the evidence of relatedness between the first information source and the second information source.

8. The microprocessor executable method of claim 4, wherein converting the natural language of the first information source includes the content of the natural language within at least one of a classified segment, a plurality of classified segments, an ontological classification, and at least a portion of a spoken communication.

9. The microprocessor executable method of claim 4, wherein converting the natural language of the second information source includes the content of the natural language within at least one of a classified segment, a plurality of classified segments, an ontological classification, and at least a portion of a spoken communication.

10. A microprocessor executable system configured to ascertain relatedness between information sources, the microprocessor executable method comprising:
   a storage medium configured to store natural language of a first information source and a second information source; and
   a processor configured to execute instructions to convert the natural language of the first information source to a first concept vector, wherein converting natural language of a first information source to a first concept vector includes processing the first information source within a lexical semantic characterization, and further wherein the concept vector is a concept-based representation of at least a portion of the first information source, and to convert the natural language of the second information source to a second concept vector, wherein converting natural language of a second information source to a second concept vector includes processing the second information source within a lexical semantic characterization, and further wherein the concept vector is a concept-based representation of at least a portion of the second information source; and determine at least one similarity between the first concept vector and the second concept vector; and calculate a metric of the at least one similarity.

11. The microprocessor executable system of claim 10, wherein the storage medium includes a Non-SQL configuration.

12. The microprocessor executable system 10, wherein the similarity includes at least one of a text relevance, a conceptual relevance, a first order concept map, a second order concept map, and a contextually weighted relevance.

13. The microprocessor executable system 10, wherein the metric includes at least one of a conceptual relevance score, a conceptually weighted score, a word pool, a first heat map associable with the first information source, a second heat map the plurality of second order concept vectors that is associable with at least a portion of the concept corpus, and a graphic representation signifying the evidence of relatedness between the first information source and the concept corpus.

14. The microprocessor executable system 10, wherein the at least one similarity includes an overlay expressible on a webpage.

15. The microprocessor executable system of claim 10, wherein the at least one similarity is ranked by the metric.

* * * * *